(12) United States Patent
Wong

(10) Patent No.: US 10,740,314 B2
(45) Date of Patent: Aug. 11, 2020

(54) SYSTEM AND METHOD OF PROVIDING A PLATFORM FOR RECOGNIZING TABULAR DATA

(71) Applicant: Matthew E. Wong, New York, NY (US)

(72) Inventor: Matthew E. Wong, New York, NY (US)

(*) Notice: Subject to any disclaimer, the term of this patent is extended or adjusted under 35 U.S.C. 154(b) by 517 days.

(21) Appl. No.: 15/512,838

(22) PCT Filed: Sep. 23, 2015

(86) PCT No.: PCT/US2015/051675
§ 371 (c)(1),
(2) Date: Mar. 20, 2017

(87) PCT Pub. No.: WO2016/049152
PCT Pub. Date: Mar. 31, 2016

(65) Prior Publication Data
US 2017/0262484 A1 Sep. 14, 2017

Related U.S. Application Data

(60) Provisional application No. 62/054,958, filed on Sep. 24, 2014.

(51) Int. Cl.
*G06F 16/22* (2019.01)
*G06F 16/24* (2019.01)
*G06K 9/00* (2006.01)

(52) U.S. Cl.
CPC .......... *G06F 16/2282* (2019.01); *G06F 16/24* (2019.01); *G06K 9/00449* (2013.01)

(58) Field of Classification Search
None
See application file for complete search history.

(56) References Cited

U.S. PATENT DOCUMENTS 7,251,653 B2 * 7/2007 Huang .................... G06F 16/90
707/756
2007/0078872 A1 4/2007 Cohen
(Continued)

OTHER PUBLICATIONS

International Search Report and Written Opinion PCT/US15/51675, filed Sep. 23, 2015 (Applicant: Wong).
(Continued)

*Primary Examiner* — Uyen T Le
(74) *Attorney, Agent, or Firm* — Neal Marcus

(57) ABSTRACT

A computer implemented method is disclosed for providing a platform for recognizing tabular data created by a plurality of applications and stored in different formats and/or organized by different standards. The tabular data comprises data within one or more rows of one or more input columns. The method comprises executing on one or more processors the steps of (a) determining one or more boundary sets for data from a data source, each set defining boundaries for header row data and data within a body row of an input column, (b) selecting a boundary set of the one or more boundary sets, (c) calculating a header score for a header row data of the input column of a boundary set, the score representing the extent to which the header row data resembles a header of a standard column, and (d) calculating an initial data score for data of an input column that represents the extent to which the data within body rows of the input column resembles the data of a standard column.

20 Claims, 8 Drawing Sheets

(56) References Cited

U.S. PATENT DOCUMENTS

| | | |
|---|---|---|
| 2011/0107254 A1 | 5/2011 | Moroze |
| 2012/0143881 A1* | 6/2012 | Baker ................... G06F 16/93 707/750 |
| 2012/0166927 A1* | 6/2012 | Shearer ................ G06F 17/246 715/212 |
| 2012/0303645 A1 | 11/2012 | Kulkarni-Puranik |
| 2013/0297661 A1 | 11/2013 | Jagota |
| 2014/0173403 A1 | 6/2014 | Bastide et al. |

OTHER PUBLICATIONS

Pinto, David, "Table Extraction Using Conditional Random Fields" Computer Science Department Faculty Publication Series, Paper 76, 2003 (9 pages).

\* cited by examiner

SYSTEM AND METHOD OF PROVIDING A PLATFORM FOR RECOGNIZING TABULAR DATA

CROSS-REFERENCE TO RELATED APPLICATIONS

This application is the national stage application of International Application PCT/US15/51675, filed Sep. 23, 2015, entitled System and Method of Providing a Platform For Recognizing Tabular Data, which claims priority to U.S. provisional application No. 62/054,958, filed Sep. 24, 2014, entitled "System and Method of Providing a Platform For Recognizing Tabular Data," which are all incorporated by reference herein.

FIELD OF THE INVENTION

The present invention relates to a system and method for providing a platform for recognizing tabular data.

BACKGROUND OF THE INVENTION

Today, most industries aggregate and process large volumes of data for various business functions. In the financial services industry for example, a sizeable amount of data (information) is often required to process certain transactions. In the diagnostic industry, a sizable amount of patient data is often required to process clinical trial results. In the medical industry, a sizable amount of data is often required to process payment transactions. In all of these examples, much of this data is stored in files (or databases or web services) created by numerous applications that originate from many sources. For example, for financial services, the sources may be banks, asset managers, institutions and hedge funds to name a few. Unfortunately, the tabular data are often stored in different formats and/or organized according to different standards that is not predefined for such tabular data, e.g., not predefined as to the data location, order or names of columns, coding conventions, scaling, units and/or other differences in the manner in which the information being conveyed by the data is represented. Suffice it to say, the data are often difficult and time-consuming to process and use for their intended purpose.

SUMMARY OF THE INVENTION

Embodiments of a system and method of providing a platform for recognizing tabular data are disclosed.

In accordance with an embodiment of this disclosure, a computer implemented method is disclosed for providing a platform for recognizing tabular data created by a plurality of applications and stored in different formats and/or organized by different standards. The tabular data comprises data within one or more rows of one or more input columns. The method comprises executing on one or more processors the steps of (a) determining one or more boundary sets for data from a data source, each set defining boundaries for header row data and data within a body row of an input column, (b) selecting a boundary set of the one or more boundary sets, (c) calculating a header score for a header row data of the input column of a boundary set, the score representing the extent to which the header row data resembles a header of a standard column, and (d) calculating an initial data score for data of an input column that represents the extent to which the data within body rows of the input column resembles the data of a standard column.

In yet another embodiment of the this disclosure, a system is disclosed, useful for recognizing tabular data created by a plurality of applications and stored in different formats and/or organized by different standards. The system comprises (a) a data store to store tabular data, each tabular data comprising data within one or more rows of one or more input columns and (b) one or more servers coupled to the data store and programmed to: (i) determine one or more boundary sets for data from a data source, each set defining boundaries for header row data and data within a body row of an input column; (ii) select a boundary set of the one or more boundary sets; (iii) calculate a header score for a header row data of the input column of a boundary set, the score representing the extent to which the header row data resembles a header of a standard column; and (iv) calculate an initial data score for data of an input column that represents the extent to which the data within body rows of the input column resembles the data of a standard column.

In yet another embodiment of this disclosure, a non-transitory computer-readable medium is disclosed for providing a platform for recognizing tabular data created by a plurality of applications and stored in different formats and/or organized by different standards. The tabular data comprises data within one or more rows of one or more input columns. The medium comprises instructions stored thereon, that when executed on a processor, perform the steps of (a) determining one or more boundary sets for data from a data source, each set defining boundaries for header row data and data within a body row of an input column, (b) selecting a boundary set of the one or more boundary sets, (c) calculating a header score for a header row data of the input column of a boundary set, the score representing the extent to which the header row data resembles a header of a standard column, and (d) calculating an initial data score for data of an input column that represents the extent to which the data within body rows of the input column resembles the data of a standard column.

In accordance with yet another embodiment of this disclosure, a computer implemented method is provided for providing a platform for recognizing tabular data created by a plurality of applications and stored in different formats and/or organized by different standards. The tabular data comprises data within one or more rows of one or more input columns. The method comprises executing on one or more processors the steps of (a) selecting a boundary set for data from a data source, the set defining a boundary for header row data and data within a body row of an input column, (b) calculating a header score for a header row data of the input column of the boundary set, the score representing the extent to which the header row data resembles a header of a standard column; and (c) calculating an initial data score for data of an input column that represents the extent to which the data within body rows of the input column resembles the data of a standard column.

In accordance with yet another embodiment of this disclosure, a system is provided, useful for recognizing tabular data created by a plurality of applications and stored in different formats and/or organized by different standards. The system comprises (a) a data store for storing tabular data, each tabular data comprising data within one or more rows of one or more input columns; and (b) one or more servers coupled to the data store and programmed to: (i) select a boundary set for data from a data source, each set defining boundaries for header row data and data within a body row of an input column; (ii) calculate a header score for a header row data of the input column of a boundary set, the score representing the extent to which the header row data resembles a header of a standard column; and (iii) calculate an initial data score for data of an input column that represents the extent to which the data within body rows of the input column resembles the data of a standard column.

DETAILED DESCRIPTION OF THE INVENTION

Figure 1:
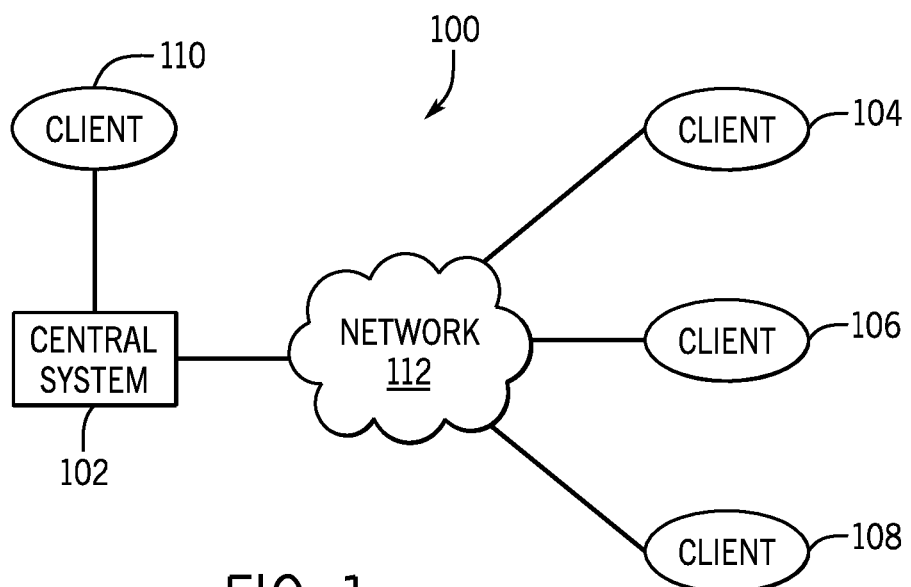
FIG. 1 depicts a block diagram illustrating an example system in which a platform for recognizing tabular data operates.

Embodiments of the present disclosure are described herein with reference to the drawing figures.

FIG. 1 depicts a block diagram illustrating an example system 100 in which a platform for recognizing tabular data operates. In this embodiment, system 100 incorporates a central system 102 that is connected to several clients 104, 106, 108 and 110 via network 112 or directly as known to those skilled in the art. Network 112 may be the Internet, local area network (LAN) or both as known to those skilled in the art. Clients 104, 106, 108, 110 may communicate with central system 102 over network 112 by cable, ISDN, WIFI or wireless carrier networks as known to those skilled in the art.

Each example client 100, 106, 108, 110 includes a personal computer and a monitor. However, clients could be smartphones, cellular telephones, PDAs, or other devices equipped with industry standard (e.g., HTML, HTTP etc.) browsers or any other application having wired (e.g., Ethernet) or wireless access (e.g., cellular, Bluetooth, IEEE 802.11b etc.) via networking (e.g., TCP/IP) to nearby and/or remote computers, peripherals, and appliances, etc. TCP/IP (transfer control protocol/Internet protocol) is the most common means of communication today between clients or between clients and systems (servers), each client having an internal TCP/IP/hardware protocol stack, where the "hardware" portion of the protocol stack could be Ethernet, Token Ring, Bluetooth, IEEE 802.11b, or whatever software protocol is needed to facilitate the transfer of IP packets over a local area network.

As described in more detail below, central system 102 includes one or more servers. The one or more servers may include a web server. Each server includes several internal components (e.g., processor, memory, drives, etc.), databases, software modules and applications (e.g., browser) as known to those skilled in the art.

Figure 2:
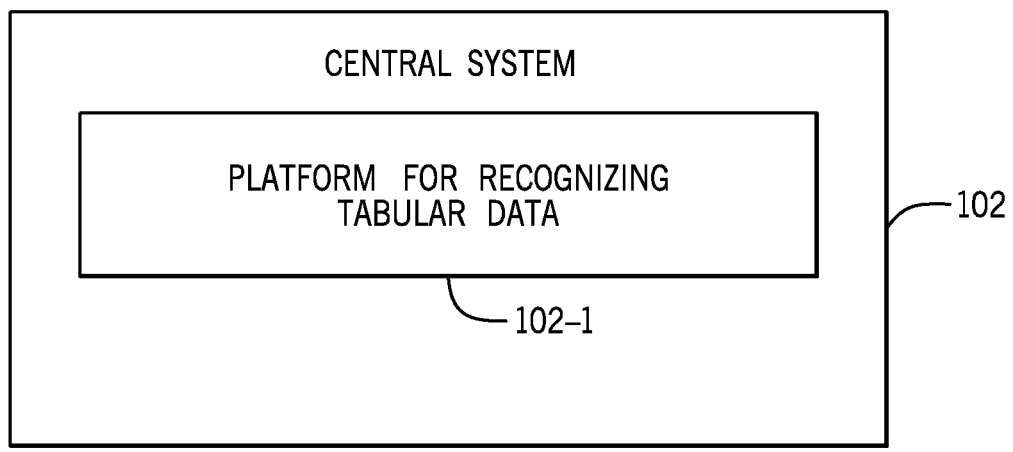
FIG. 2 depicts an enlarged block diagram of the central system in FIG. 1 wherein the platform is shown.

As shown in FIG. 2, central system 102 incorporates platform 102-1 for recognizing tabular data that comprises one or more applications or modules. In brief, platform 112-1 is a framework that identifies and transforms tabular input data from different electronic files (including electronic data streaming), each of which does not necessarily conform to any specific standard related to data location, format and/or quality, into tabular data that conforms to a specific standard related to (i.e., recognizable by) data location, format and quality, for subsequent use. Tabular input data may be provided to the recognition platform 102-1 through any number of means, including i) electronic files (also called files) created with pertinent data by any of numerous applications such as Excel, CSV, fixed width text, tab limited, HTML tables, database applications (e.g., Oracle, SQL) etc., ii) an electronic service, and/or iii) an application programming interface, as known to those skilled in the art.

In the financial services industry for example, a sizeable amount of data (information) is often required to process certain transactions. Much of this data may be retrieved from these files (or databases, web services or other data sources known to those skilled in the art) that are created by numerous applications from many sources (e.g., banks, asset managers, institutions that create assets, hedge funds, trading entities, brokers investment management trustees to name a few), each of which may contain the relevant tabular data in different formats and/or organized according to different standards that is not predefined as to such tabular data, e.g., not predefined as to the data location, order or names of columns, coding conventions, scaling, units and/or other differences in the manner in which the information being conveyed by the data is represented. Platform 102-1 employing the tabular data recognition method described herein enables users executing these transactions to facilitate the processing of these transactions. Tabular data conforming to a specific standard is useful in other industries as known to those skilled in the art.

Figure 9:
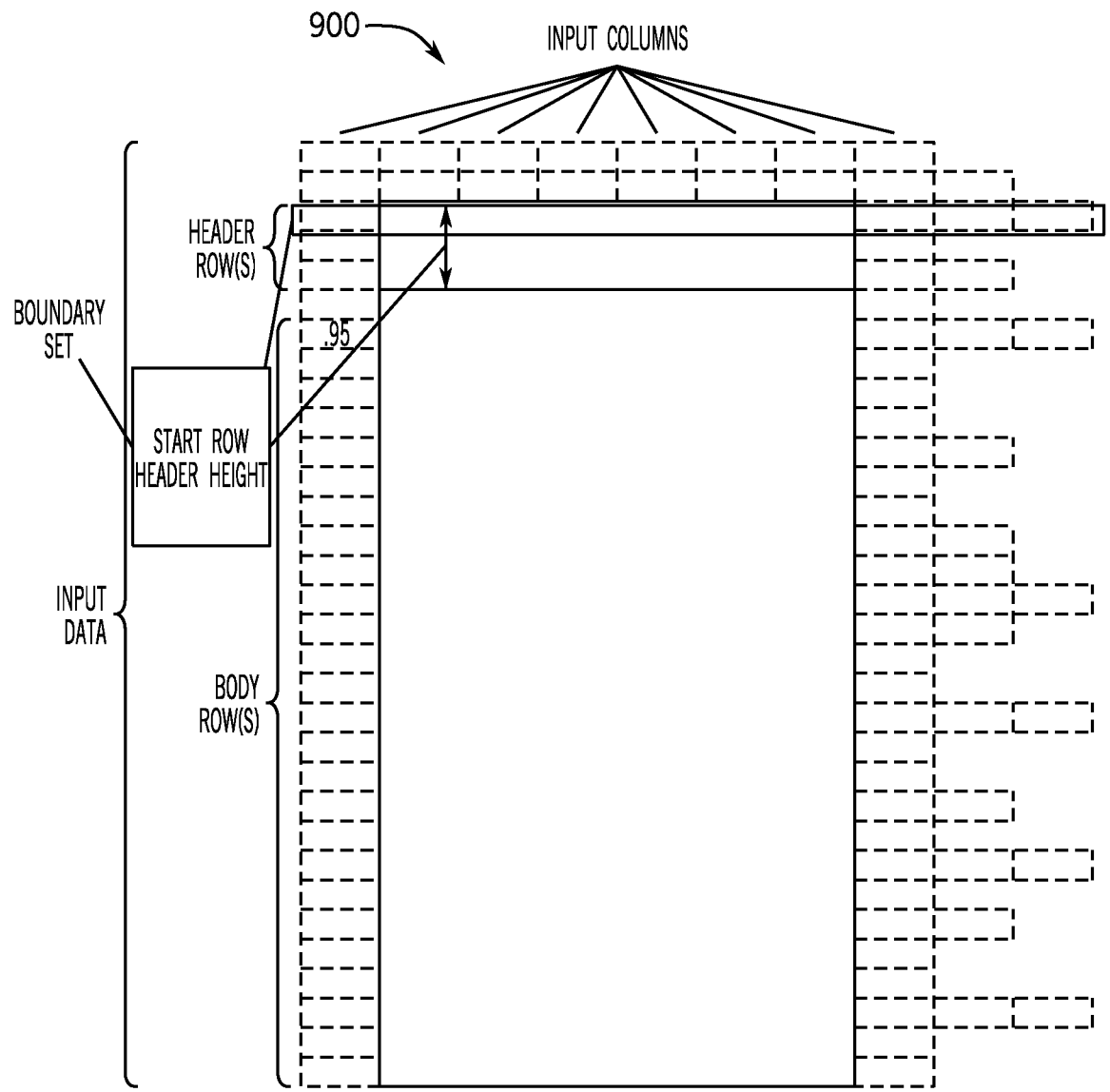
FIG. 9 depicts a sample table wherein sections are identified by term as used in the sample method of FIG. 3.

Platform 102-1 generally embodies five high level actions. Prior to scanning input data, a configuration must be input to the platform 102-1. The configuration defines a data domain, which represents the nature or type of data under examination. For example, "auto loan data" might be one domain in the financial services industry, and "mortgage loan data" might be another domain. The configuration defining the domain may be determined manually by a user, or automatically (possibly employing tabular data recognition in the process) based on an examination of the input tabular data, or by other means, so long as it is input to platform 102-1 to evaluate the data. Next, the input data, consisting of rows of columnar data as described in detail below with respect to FIG. 9, is scanned from the source and optionally stored for use in the following step. Lastly, rules as set forth in the domain configuration are evaluated with respect to (i.e., applied to) the (stored) input data to generate scores, standard (recognizable) column definitions and other outputs. (As stated, the domain configuration includes a collection of user-defined rules (which utilize formulas or definitions) that define how to calculate the scores) These high-level actions are described in more detail below.

Figure 3:
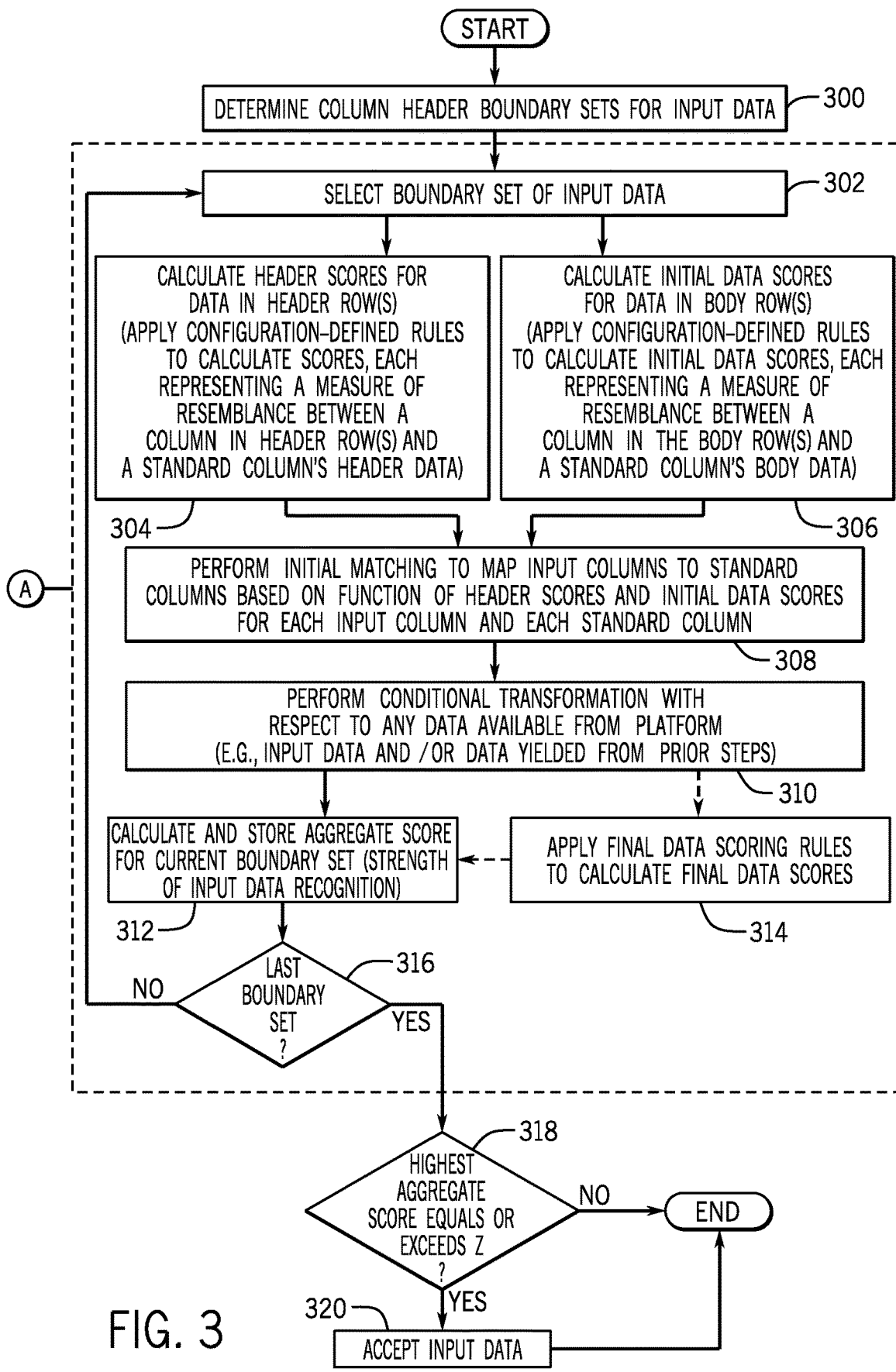
FIG. 3 depicts example method steps for implementing the platform for recognizing tabular data is shown in FIG. 2.

FIG. 3 depicts example method steps for implementing platform 102-1 for recognizing tabular data. Reference is also made to FIG. 9 wherein an example table 900 is shown. Sections of table 900 are identified by terms that are used throughout the example method steps of FIG. 3. In particular, the tabular data comprises a number of cells of raw data (one value shown) that make up a dataset as known to those skilled in the art. Table 900 may be stored as a file, in a database, as part of web service or other data source known to those skilled in the art. Table 900 has several input columns with input data as identified in FIG. 9. The input data comprises several header rows and body rows (of data). Input data, however, may include any number of header rows or body rows as known to those skilled in the art. A boundary set is the location of the data within a header row and body row of the input data. A boundary set is defined by start row and header height (i.e., number of rows having header data).

Returning to FIG. 3, execution begins at step 300 wherein all possible column header boundary sets are determined for the input data (i.e., data of input columns) and per the boundary set limitations as specified in the configuration. As indicated above, each boundary set determines the location of the data within the header row and data within the body rows of the input data (as identified in FIG. 9). The maximum number of boundary sets is a function of the configuration parameters, discussed in more detail below, that define maximum header start row and maximum number of header rows spanned. (Suppose for example, that platform 102-1 is employed to recognize tabular data that represents a list of financing transactions of a television store (e.g., accompanying a customer purchase of an expensive TV)). Suppose also that the recognizable tabular data includes one or more of the following characteristics or parameters, which are identified as "standard columns" (i.e., recognizable columns) in the table below.

| Characteristic ("Standard Column") | Comment |
| --- | --- |
| Customer Last Name | Usually text containing zero or one space or hyphen |
| Customer First Name | Usually text containing zero or one space or hyphen |
| Initial balance of loan | Usually a dollar figure that exceeds $200 |
| APR | Usually a number between 0.01 and 0.25, or between 1 and 25 |
| Date of transaction | Date earlier than today's date and later than Jan. 1, 2000 |

Input data may contain column headers that begin in the first row of a table. However, the first row (or several rows) may contain other information such as the name of the table or other miscellaneous information. Furthermore, headers information may span multiple contiguous rows (for example, for the header name "Last Name," "Last" might appear in one row while "Name" appears in the row below it). Platform 102-1 adjusts for these variations by analyzing its input under different assumptions for the location in which the header rows are located, up to a configuration-specified maximum header start row and maximum number of header rows spanned. For this example, these specified maximums are 6 and 3, respectively.

Next, platform 102-1 will calculate all possible pairs of whole numbers for the header height (header_height) and start row (start_row) (each pair, a boundary dataset) representing the height (in number of rows) of the header information and the row on which header information starts, respectively, such that header_height is between 1 (or some other configuration-specified minimum) and the configuration-specified maximum header height, and start_row is between 1 (or some other configuration-specified minimum) and the maximum start row specified by the user or the configuration. Each such distinct pair of values (start_row and header_height) is a boundary set. Methods for calculating all boundary sets, i.e. all such pairs of numbers meeting the aforementioned described criteria, is known to those skilled in the art.

This example will be used below. First, all boundary sets for the given input data are determined, and then execution moves on to the process within box "A" wherein steps 302-312 are repeatedly executed for each boundary set as described below. The loop is repeated until all boundary sets have been processed.

Execution now moves to step 302 wherein a boundary set is selected. Execution then moves to steps 304 and 306 wherein header scoring and initial data scoring are performed. In this embodiment, step 306 is executed alongside step 304 as shown. (However, in alternative embodiments, steps 304 and 306 may be executed in series, and the result of one step may impact the execution of the other step (for example, if step 304 yields a result of zero, step 306 might be skipped). This is described in more detail below.

With header scoring 304, the header scores for the data in header rows are calculated. Header scoring 304 essentially measures the degree to which the data within the header rows of any column (which may also be referred to herein as "header input data" or "header data" for such column) resembles header data for any standard (i.e., recognizable) column. That is, header scoring generates a score (which may herein be referred to as a "header score"), based a rule in the configuration, that quantifies the resemblance between the data within the header row(s) of a column and the header of a known standard column.

For each standard column, one or more formulas or rules are employed (i.e., evaluated) on each input data column to yield a header score representing a measure of the resemblance between such standard column and such input data column's header data. It is the rule creator that ensures that such scoring rule or formula yields the appropriate score. For example, the configuration might specify that a formula or rule for the standard column "Current Balance" returns a score of 0.95 if the header input data consists of the word "current", followed by zero or more whitespace characters, followed by the word "balance", or otherwise return a score of 0. Each formula is composed of one or more elements, each of which may be a literal number or string of characters, a reference to some or all of the input data, its rows, and/or its columns or metadata thereof, or any other value that can be derived or calculated, and such elements are operated on by mathematical or other predefined functions as specified in the formula. Header scoring formulas may evaluate to a numerical, text or other value (including an array of values). Functions available for use in such formulas may include standard mathematical operations, regular expression matching (or negated matching), string manipulation, array manipulation and mapping, data type checking, environment variable and runtime variable access, and others that may be useful for the recognition analysis. The implementation of formulas and related elements, operators and functions as described above is known to those skilled in the art.

Figure 4:
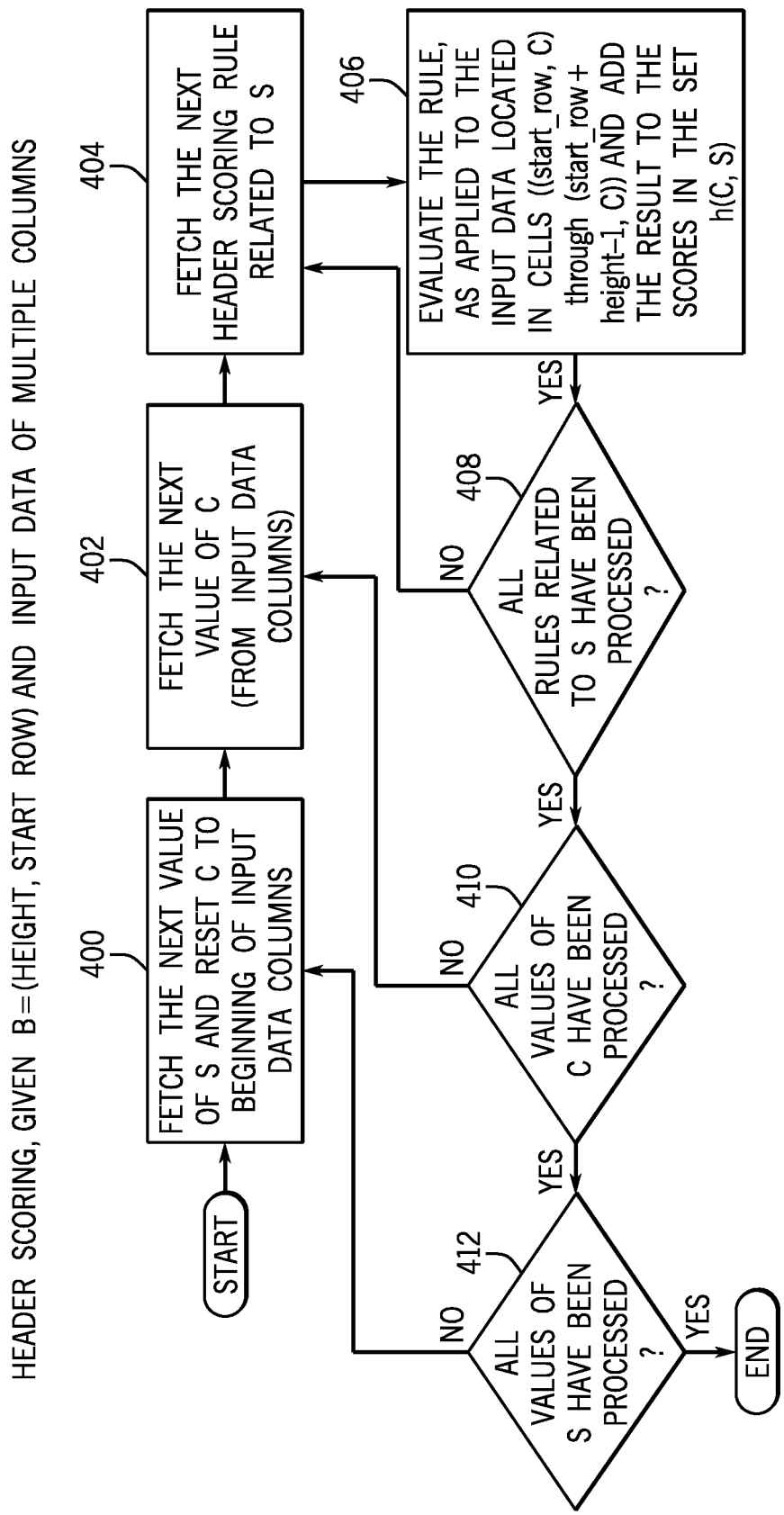
FIG. 4 depicts example method steps for performing header scoring as shown in FIG. 3.
Figure 5:
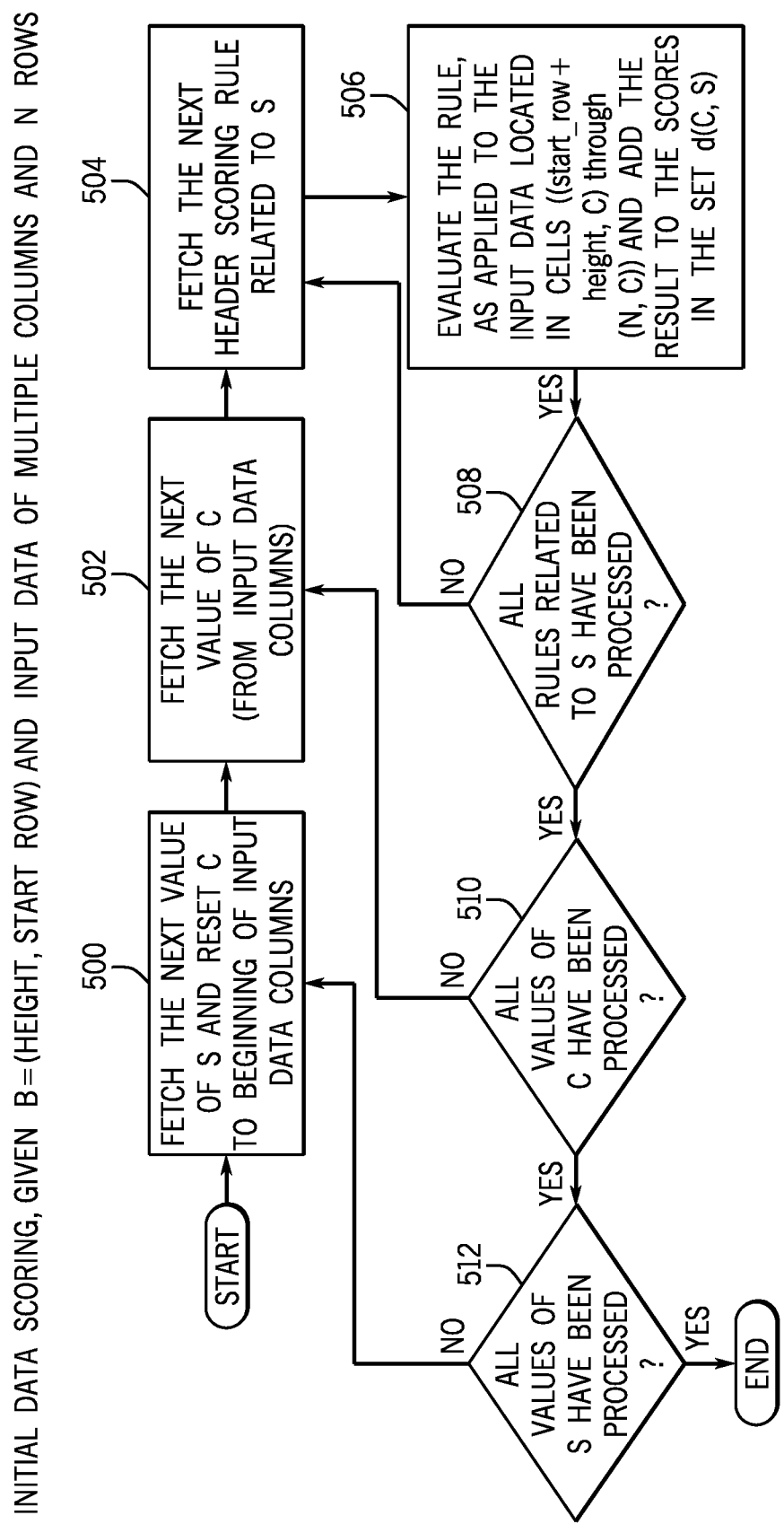
FIG. 5 depicts example method steps for performing initial data scoring as shown in FIG. 3.

The header scoring process is depicted in FIG. 4 wherein the execution of step 304 is broken down in sub-steps. Specifically, execution begins at sub-step 400 wherein (1) for each standard column S (sub-steps 400 and 412), (2) for each input column C (sub-steps 402 and 410), and (3) for each header rule relating to S (sub-steps 404 and 408), such header rule is evaluated (applied) at sub-step 406 with respect to the header data (i.e. the data located in cells (start_row, C) through (start_row+header_height−1, C)). The resulting score is stored (by adding the result as a new item to the set of header scoring results that are associated with such input column C and such standard column S, which is referred to heretofore, for any given C and S, as "h(C, S)"). That is, execution essentially moves through sub-steps 400-406, and then decision sub-steps 408, 410, 412 to determine whether to return to sub-steps 404, 402 and 400, respectively (for the related nested loop). ("B" in FIG. 4-5 is a boundary set.)

As a simple example of this flow portion, if there exist 6 standard columns, 5 input columns, and each standard column has 3 header rules, then step 406 will execute 90 times (6×5×3) (unless the implementation supports the ability to skip the evaluation of certain rules under certain circumstances). The specific rules described herein are merely examples. Those skilled in the art know that often, many different variations of a rule may be employed to achieve the same desired results. In other embodiments, if so desired, not all rules need be evaluated in every circumstance, and not all scores need be stored. A simple example appears below.

Example. For purposes of this example, it is assumed that the input data will be in a form consisting of one or more rows, which are referred to herein as the "header rows," that contain data for each column representing a name or description (for example, "Last Name") of the data in such column that follows such header rows, followed by one or more rows of data, which continue until the end of the input data or the end of the table as otherwise determined, which are referred to herein as the "body rows." These assumptions are not required to be true for platform 102-1, but are used to provide for clearer examples.

For the standard column "Customer Last Name," in our example, it is anticipated that some input data might instead name this column "Last Name," while others might use variations thereof such as "LName", "Last_Name," etc. In addition, if the header input data is of the form "Last Name," then it is anticipated that this is a stronger indication that such data is the header of the "Customer Last Name" standard column than if the header input data is simply "Name." Based on these assumptions, a header scoring rule may be constructed as follows:

1. if the text (in header input data) is "Last Name," return the highest score, which we will arbitrarily set to 100%.

2. otherwise, if the text (in header input data) is an "L" followed by zero or one character followed by "Name", return a score of 90%.

3. otherwise, if the text (in header input data) is "Name", return a score of 50%.

4. otherwise, return a score of zero.

Using platform 102-1, the above header scoring rules can be implemented using a series of regular expression match tests. Similarly, header scoring rules can be created for the other standard columns, examples of which are shown below.

| Standard Column | Rule ID | Match expression | Score |
| --- | --- | --- | --- |
| Customer Last Name | H1 | (customer)?last.?name | 1 |
| | H2 | l.?name | 0.9 |
| | H3 | cust.*name | 0.6 |
| | H4 | name | 0.5 |
| | H5 | last | 0.3 |
| Customer First Name | H6 | (customer)?first.?name | 1 |
| | H7 | f.?name | 0.9 |
| Initial balance of loan | H8 | (init|open).*(bal|amount) | 1 |
| | H9 | (bal|amount) | 0.5 |
| APR | H10 | apr | 1 |
| | H11 | ann.*(percent.*|pct)rate | 1 |
| | H12 | rate | 0.5 |
| Date of transaction | H13 | date | 0.5 |
| | H14 | dt | 0.4 |

For the example rules shown above, each rule contains a formula that evaluates to or computes a number, and each rule is associated with one standard column. As known by those skilled in the art, any formula-based approach may be employed, and the evaluation result need not be numeric. In other embodiments, expression matching with a related score may be employed. In yet other embodiments, flow control may be supported using if/then (or similar) constructs and built-in functions. In an alternative to this or any such other embodiment, the use of expression matching is not necessarily required, and may be invoked through the choice of functions that are available to the rule. This might be expressed, for example, as follows (expressed below using regular expression syntax, as known to those skilled in the art):

| Standard Column | Rule ID | Rule |
| --- | --- | --- |
| Customer Last Name | H1 | if match(input, "(customer)?last.?name") then 1 else 0 |
| | H2 | if match(input, "l.?name") then 0.9 else 0 |
| | H3 | if match(input, "cust.*name") then 0.6 else 0 |
| | H4 | If match(input, "name") then 0.5 else 0 |
| | H5 | If match(input, "last") then 0.3 else 0 |
| Customer First Name | H6 | if match(input, "(customer)?first.?name") then 1 else 0 |
| | H7 | if match(input, "f.?name") then 0.9 else 0 |
| Initial balance of loan | H8 | if match(input, "(init|open).*(bal|amount)") then 1 else 0 |
| | H9 | if match(input, "(bal|amount)") then 0.5 else 0 |
| APR | H10 | if match(input, "abr") then 1 else 0 |
| | H11 | if match(input, "ann.*(percent.*|pct)rate") then 1 else 0 |
| | H12 | if match(input, "rate") then 0.5 else 0 |
| Date of transaction | H13 | if match(input, "date") then 0.5 else 0 |
| | H14 | if match(input, "dt") then 0.4 else 0 |

In addition to the supporting a function such as the "match" function in the above examples, embodiments may support other functions to enable sufficient flexibility and utility of formulas. These might be, for example, statistically-based, string-manipulation based, and date-based, as may often be found in analytical applications as known to those skilled in the art. In addition, functions useful for rule construction might include functions related to tabular data analysis, such as "offset" (which returns a value that is located in the specified number of rows of columns from the specified anchor location), and functions providing access to platform 102-1 calculated values, such as "header_score" (which returns the specified value or values of score results from the header scoring rules), "current_row" (which returns the current row of the data being processed), or "cell" (which returns the value of data located in the given row and column), as well as functions for returning values related to the current boundary set, standard column and/or input column, or other functions as described above, as known to those skilled in the art.

Returning now to FIG. 3, reference is made to step 306 wherein initial data scores for the data in the body rows (of input column) are calculated. As indicated above, in this embodiment, step 306 is executed along side step 304. (Alternatively, the step 304 and 306 may be executed in series in other embodiments.) In the data scoring process, one or more rules (containing one or more formulas) from the configuration are employed to produce a score that represents the extent to which the data within the body rows of any input column (referred to herein as the "column body data" for such input column) resembles the data of any standard (i.e., recognizable) column. That is, in data scoring, for each standard column, a series of rules or formulas are employed (i.e., evaluated) to score the extent to which the column body data of any input column resembles the type of data that one would expect to find in such standard column. Initial data scoring generates a score that acts as a ranking or probability that the data within a body row of a column is the data of a standard column). For example, a formula for (start_row+height+N, C), where N is the number of rows in the column body data, i.e., data with the body of a column) and the resulting value is stored (by adding the result as a new item to the set of data scoring results that are associated with such input column C and such standard column S, which is referred to heretofore, for any given C (column) and S (standard column), as "d(C, S)") (sub-step 506). In other embodiments, if so desired, not all rules need be evaluated in every circumstance, and not all data score results need to be saved in every circumstance. That is, execution essentially moves through sub-steps 500-506, and then decision sub-steps 508, 510, 512 determine whether to return to sub-steps 504, 502 and 500, respectively (for the related loop). As a simple example of this flow portion, if there exist 6 standard columns and 5 input columns, and each standard column has 3 data scoring rules, then step 506 will execute 90 times (6×5×3) (unless the implementation supports the ability to skip the evaluation of certain rules under certain circumstances).

Initial data scoring rules can employ any formula (that uses supported functions and inputs) which allows platform 102-1 to support complex scoring approaches, but for the example in the table below, the initial data scores will simply be equal to the percentage of data values that conform to certain expectations. Because these rules are evaluated in respect of column body data which may contain many rows, the scoring rules may employ aggregate functions such as "sum", which returns the sum of the N values that result from evaluating the function argument for each body row, and row count ("row_count"), which returns N (and is equivalent to "sum(1)"). Aggregate functions are commonly employed in database and other applications and are known to those skilled in the art. Initial data scoring rules could, for example, include the following:

| Standard Column | Rule ID | Formula |
| --- | --- | --- |
| Customer Last Name | D1 | sum(map(if value is a string of characters that are alpha [a-z] or space or hyphen, then 1, else 0)) / row_count |
| Customer First Name | D2 | sum(map(if value is a string of characters that are alpha [a-z] or space or hyphen, and contains zero or one space or hyphen, then 1, else 0)) / row_count |
| Initial balance of loan | D3 | sum(map(if value is numeric and greater than 200, then 1, else 0)) / row_count |
| APR | D4 | sum(map(if value is numeric and between 0.01 and 25, then 1, else 0)) / row_count |
| Date of transaction | D5 | sum(map(if value is date earlier than today's date and later than Jan 1 2000, then 1, else 0)) / row_count |

"Current Balance" might return a score, for a given column body data, equal to the percentage of values that are numerical values between 200 and 10,000, i.e. the number of values in the data within the body of a single column i.e., column body data (where each body row yields one value) that are numbers between 200 and 10,000, divided by the total number of values in the column body data. Unlike the header scoring rules discussed above, which are evaluated with respect to the header rows of the input data, data scoring rules are evaluated with respect to the data within the body rows of the input data.

The discussion above is depicted in FIG. 5 wherein the execution of step 306 is broken down in sub-steps. Specifically, execution begins at sub-step 500 wherein (1) for each standard column S (sub-steps 500 and 512), (2) for each input column C (sub-steps 502 and 510), and (3) each data scoring rule relating to S (sub-steps 504 and 508), such data scoring rule is evaluated with respect to the related body data (i.e. the data located in cells (start_row+height, C) through As indicated above, in this embodiment, step 306 is executed along side step 304. (Alternatively, the step 304 and 306 may be executed in series in other embodiments, which, for example, might not perform data scoring if the related header score is 0, and instead proceed directly to step 308, effectively skipping step 306, as known to those skilled in the art.)

Figure 6:
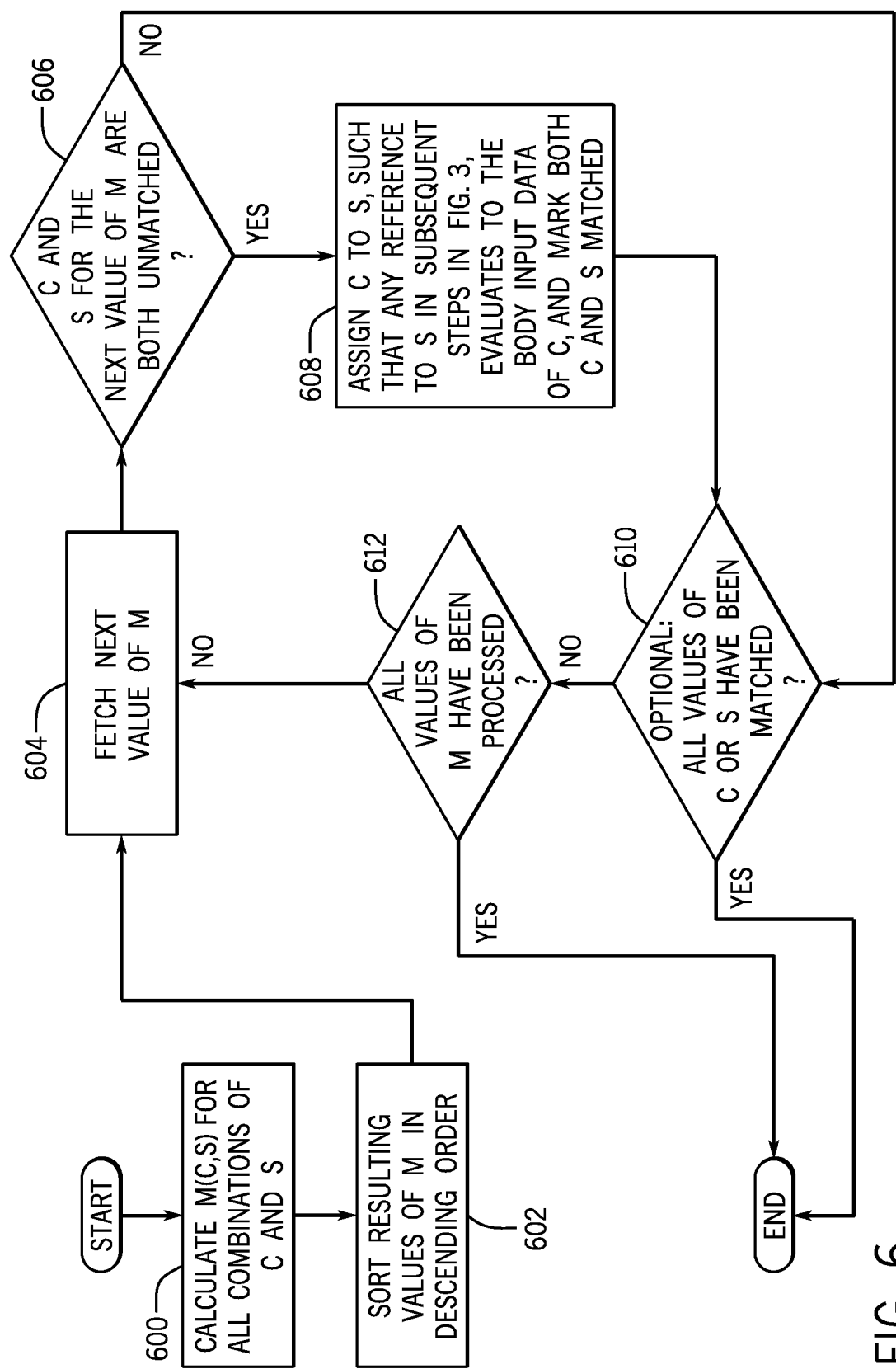
FIG. 6 depicts example method steps for performing initial matching as shown in FIG. 3.

Returning to FIG. 3, execution moves to step 308 wherein initial matching is performed on the data in the table. Initial matching is the process of making a preliminary determination as to which of the input columns (C) should map (i.e., match) to which standard columns (S). This determination employs a function (M) of the header scores (h) and the initial data scores (d) for each input column and standard column. This process is shown in FIG. 6. In embodiments of platform 102-1, the formula defining M may be "hard-coded" or may be user-defined. For example, M may be defined as shown below, using a function "max" that returns the maximum value from a set of input values:

$$M(C, S) = \max(h(C, S)) * \max(d(C, S))$$

(However, those skilled in the art know that other formulas may be used for M as desired to accomplish the same goal, i.e., to provide a measure as to how strong of a match there is between an input column and standard column as described above.) This function M is evaluated for every permutation of (C, S) for a total number of results equal to the product of the number of input columns and the number of standard columns, as shown in execution sub-step 600. Next, these results are sorted from highest to lowest value at execution step 602. Execution then moves to sub-step 604 wherein the next value of M is used (starting with highest value and then descending to next value). (At this point, an alternative embodiment may test whether the current value of M meets a threshold value, and, if the test fails, the process will end as shown. Next, execution moves to decision sub-step 606 wherein it is determined whether either the related input column (C) or the standard column (S) for that value of "M" have already been marked in step 608 as being matched (initially, neither will have been matched already because step 608 has not yet executed the first time step 606 has been reached). If neither have already been matched, the execution moves to step 608 wherein input column (C) and standard column (S) are marked as being matched to each other, such that any subsequent reference to S will evaluate to the column body data of C, and execution moves to sub-step 610. This is implemented by storing, for each S, a formulaic definition, initially null, which is replaced with a reference to C when a match is effected, as known to those skilled in the art. If in step 606 either C or S are determined to already have been matched, sub-step 608 is bypassed and execution moves directly to sub-step 610.

At decision sub-step 610 wherein it is determined whether either all input columns have been matched, or all standard columns have been matched. If so, execution ends. If not, execution moves to decision step 612 wherein it is determined whether all values of M have already been processed. If yes, execution ends as shown. If not, execution returns to sub-step 604 to repeat the execution loop. Sub-step 610 is included solely for improved performance speed, but other embodiments may choose to skip this step and go directly to sub-step 612 instead.

Returning now to the process in FIG. 3, execution moves to step 310 wherein conditional transformation is performed. Conditional transformation is performed with respect to any data available to platform 102-1 (e.g., the input data and/or data results yielded from the prior steps 304-306 described above). The purpose of conditional transformation is to effect, when one or more given conditions are met, further data transformation (i.e., redefinition of how any standard column is calculated) following the initial matching that was performed in step 308. In this embodiment, each conditional transformation rule comprises two components: (1) a condition, expressed as a formula that evaluates to true or false and (2) one or more transformations, each comprised of a standard column and a new definition, expressed as a formula which, upon the condition evaluating to true, will replace the definition of such standard column so that any subsequent reference to such standard column (in the step 308 or later) will evaluate to such new definition. (In other embodiments, each conditional transformation rule may comprise a condition, a standard column, and a new definition, rather than a condition and one or more transformations that in turn comprise the standard column/new definition pairs.) Each condition may or may not be related to the input data as known to those skilled in the art. For example, the condition may test whether today's date exceeds a given date in time (non-related to input data) or test whether a particular standard column has a definition that references an input column (related to input data).

Figure 7:
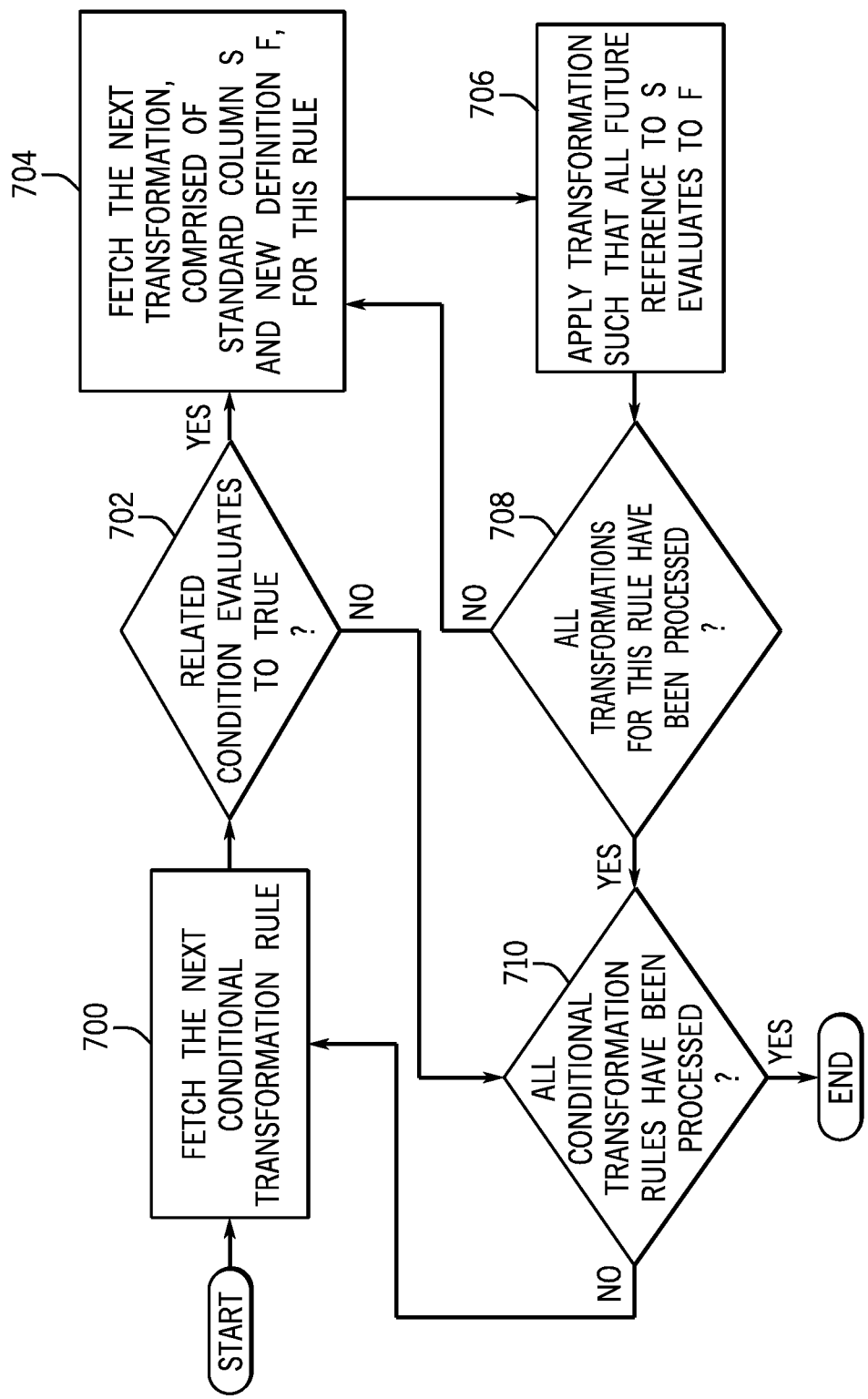
FIG. 7 depicts example method steps for performing conditional transformation as shown in FIG. 3.

Execution of step 310 is performed by the sub-steps shown in FIG. 7. At sub-step 700, each unprocessed conditional transformational rule (CT) is fetched. At sub-step 702, the condition related to CT is evaluated. In this embodiment, every conditional transformation rule is always processed. In alternative embodiments, however, not all conditional transformation rules need be processed in every circumstance. If the condition at sub-step 702 is not satisfied, execution moves to decision sub-step 710 wherein it is determined whether all conditional transformational rules have already been processed. If no, then execution moves to step 700. If yes, then execution ends. If the condition at decision sub-step 702 is satisfied, then for each transformation, comprised of a standard column S and a new definition F, of such rule (sub-step 704), the transformation is effected (sub-step 706) such that any future reference to S evaluates to F, i.e. the definition of S is set to F. After all related transformations for this rule have been processed at step 708, execution moves to decision sub-step 710 wherein it is determined if all conditional transformation rules have been processed. If so, then execution ends. If not, execution returns to step 702.

A conditional transformation rule generally changes the formulaic definition associated with any standard column as specified in that rule's transformations, effective for all subsequent processing acts, if the specified condition is met.

For example, if it is anticipated that first name and last name might be combined into a single column, then a conditional transformation rule may be used to check whether a) a definition has been created for "Last Name," but not for "First Name," and b) the data produced by such definition resembles a combination of first and last name. The rule logic could then be the following: if the definition of "Customer First Name" is null and "Customer Last Name" is non-null, and if at least 80% of the data in Customer Last Name is in the form of two, three, or four blocks of short text delimited by a space or hyphen, then split each data value and assign the first part to "Customer First Name" and the rest to "Customer Last Name."

In addition, percentage values for APR might be a number between 0 and 1, or a number between 0 and 100 (for example, 12% might come as the number "0.12" or as the number "12"). If percentage values are preferred to be in the range of 0 to 1, a conditional transformation rule can be applied to standardize these values as follows: if at least 50% of the data in the standard column APR is between 1 and 25, then transform APR to be equal to the prior value of APR, divided by 100. So, in summary, two conditional transformation (CT1 and CT2)

Example rules CT1 and CT2 are set forth below.

| Rule ID | Condition | Transformations |
|---------|-----------|-----------------|
| CT1 | "Customer First Name" is defined as null and "Customer Last Name" is not defined as null, and at least 80% of the data in "Customer | T1-1: Redefine "Customer First Name" as f1(Customer First Name) T1-2: Redefine "Customer Last Name" |

| Rule ID | Condition | Transformations |
|---|---|---|
| | Last Name" is in the form of two, three, or four blocks of short text delimited by a space or hyphen | as f2(Customer Last Name) where x is any input, n is the total number of words in x, f1(x) = the first (n − 1) words in x, and f2(x) = the last word in x |
| CT2 | "APR" is not defined as null, and at least 50% of the data in "APR" is greater than or equal to 1 and less than or equal to 25 | T2-1: Redefine "APR" as f3(APR), where f3(x) = x' divided by 100 |

Returning to FIG. 3, execution moves to step 312 wherein aggregate scores are calculated and stored. Aggregate scoring is a user-definable formula that generates a score that represents the level of confidence, i.e., likelihood that the boundary set that produced the outcomes of the user defined rules (including the formulaic definitions of each standard column), as well as the rule outcomes, identifies the header rows and the body rows correctly, i.e., as the creator or the input data intended (presuming that the configuration rules accurately predict that intention). That is, the aggregate score is essentially a ranking of the strength of the recognition of input data (i.e., header row data and data within body rows of input column). Examples of information that may be incorporated into the aggregate score includes the number of columns that were successfully matched, the number of rows that were successfully scanned, and the percentage of input data and/or standard column data (resulting from evaluation of the standard column definitions) that conformed to initial and/or final data quality rules.

The aggregate score value can be a one-dimensional number (such as 95), or can be a two-dimensional array of numbers (such as [10, 4, 95]). In either case, a special formula or value Z is also used to act as a threshold to indicate whether the input data should be accepted as containing recognizable tabular data was met. Any aggregate score equal to Z indicates that no recognizable tabular data was found (and any other value indicates that recognizable tabular data was found). In this embodiment, Z equals zero. For the purpose of simplifying this example, an aggregate scoring rule is used as follows: add the total number of standard columns that were matched (i.e. were left with non-null definitions), subtract 1/N(d) where N(d) equals the number of table column body data rows, and add 1/N(h) where N(h) equals the header height (header_height) value for the current boundary set. An alternative rule might be to sum all final data scoring rule results (dashed arrow). The aggregate scoring process may incorporate final data scores in sub-step 314. This will be discussed below.

Execution moves to decision step 316 wherein it is determined if the last boundary set has been reached. That is, the process steps 302-316 within the box identified as "A" in FIG. 3 are repeated for any additional boundary sets. If there are boundary sets remaining, execution returns to steps 302 with respect to the next unprocessed boundary set. If all boundary sets have been processed, execution moves to decision step 318 wherein any boundary set (and any related information thereof, including calculation results and standard column definitions) with the highest aggregate score is identified, where Z is always deemed to be the lowest possible score. Methods for identification of such highest aggregate score is known to those skilled in the art. If such aggregate score does not equal Z (value), execution continues to step 320 wherein the method returns a result of "accept", together with the related boundary set and its related information and execution ends. If such aggregate score equals Z, execution ends and the method returns no result (or its equivalent).

Figure 8:
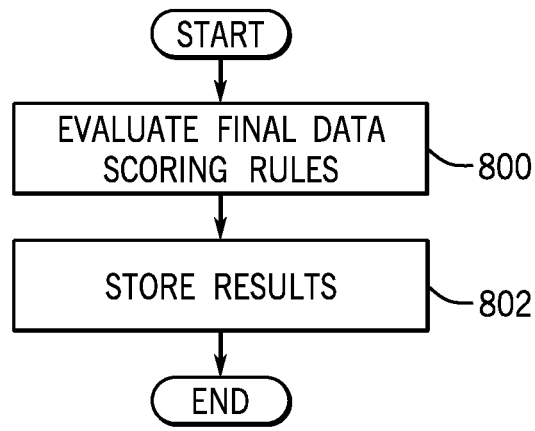
FIG. 8 depicts example method steps for performing final data scoring as shown in FIG. 3.

Now, reference is made to step 314 wherein final data scoring rules are applied to calculate final data scores as described above. Final data scoring rules may be, but are not required to be, used for the aggregate score calculation, as determined by the aggregate score formula and the platform implementation. (In this respect, execution would also proceed from step 310 to step 314, and then on to step 312 as depicted in FIG. 3 (dash arrows)). FIG. 8 depicts the process sub-steps for performing final data scoring rules. Specifically, the final data scoring rules are evaluated at sub-step 800 and the results are stored at step 802.

Examples of final aggregate scoring rules are as follows:

| Related Std Column | Rule ID | Final data scoring formula | Description |
|---|---|---|---|
| Customer Last Name | F1 | If null, then 0, else sum(if value is a string of characters that are alpha [a-z] or space or hyphen, and contains zero or one space or hyphen, of length between 2 and 25, then 1, else −1) / row_count | The percentage of data identified as "Customer Last Name" that is alphabetic text consisting of one or two space- or hyphen-delimited words of a total length between 2 and 25, minus the percentage of data failing such criteria |
| Customer First Name | F2 | If null, then 0, else sum(if value is a string of characters that are alpha [a-z] or space or hyphen, and contains zero or one space or hyphen, of length between 2 and 25, then 1, else −1) / row_count | The percentage of data identified as "Customer First Name" that is alphabetic text consisting of one or two space- or hyphen-delimited words of a total length between 2 and 25, minus the percentage of data failing such criteria |
| Initial Balance of Loan | F3 | sum(if value is numeric and greater than 200, then 1, else −1) / row_count | The percentage of data identified as "Initial Balance of Loan" that represents a number greater than 200, minus the percentage of data failing such criteria |

-continued

| Related Std Column | Rule ID | Final data scoring formula | Description |
|---|---|---|---|
| APR | F4 | sum(if value is numeric and between 0.01 and 0.25, then 1, else −1) / row_count | The percentage of data identified as "APR" that represents a number between 0.01 and 0.25, minus the percentage of data failing such criteria |
| Date of Transaction | F5 | sum(if value is date earlier than today's date and later than Jan 1 2000, then 1, else −1) / row_count | The percentage of data identified as "Date of Transaction" that represents a date between Jan. 1, 2000 and today, minus the percentage of data failing such criteria |

In practice, it is desired to raise a score or decrease a score depending upon the degree to which the results from evaluation of any standard column definition resembles the data that such standard column should contain (either independent of or dependent on other data): the greater the resemblance, the greater the score; the less the resemblance, the lower the score. Accordingly, for data other than APR, the same formulas used for the initial data scoring may be employed for final data scoring, with a change such that the value of 1 is added to the aggregate score if the data is valid and subtracted if the data is missing or invalid. For APR, an additional change could be effected to require that all values are between 0.01 and 0.25 (instead of between 0.01 and 25), to reflect the expectation that once the conditional transformation rules have been applied, all APR values should be between 0.01 and 0.25, regardless of whether they initially were between 1 and 25.

An example of an actual execution of platform 102-1 on input data is shown in the rear of this disclosure.

Figure 10:
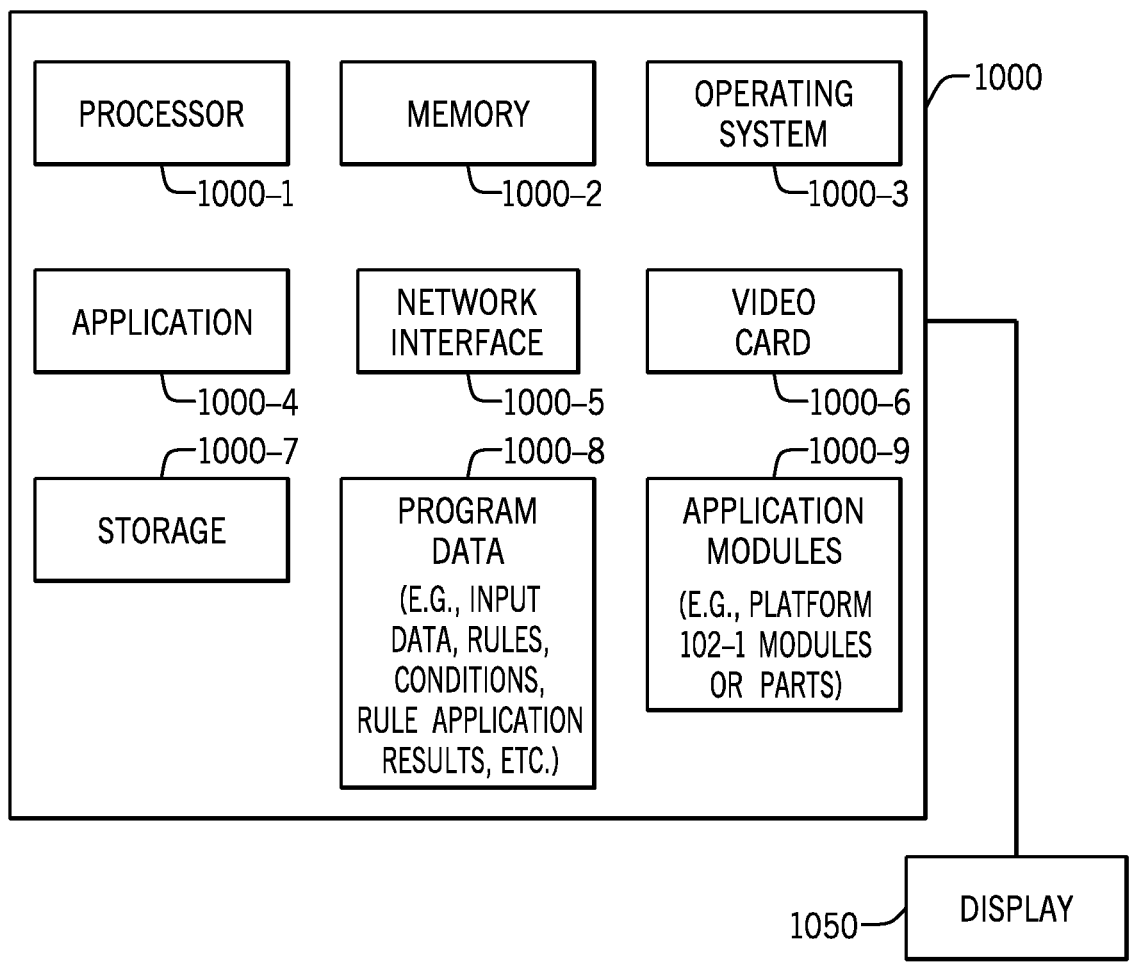
FIG. 10 depicts a general-purpose computer to support the embodiments of the computer-implemented systems and methods including computer components disclosed in this application.

FIG. 10 depicts a block diagram of a general-purpose computer to support the embodiments of the systems and methods disclosed herein. In a particular configuration, the computer 1000 may be a server or a computer (client) as described above. The computer 900 typically includes at least one processor 1000-1 and system memory 1000-2 (volatile RAM or non-volatile ROM). System memory 1000-2 may include computer readable media that is accessible to the processor 900-1. The memory 1000-2 may also include instructions from processor 1000-1, an operating system 1000-3 and one or more application platforms 1000-4 such as Java and a part of software modules or one or more software applications (i.e., steps) and/or modules 1000-9 (e.g., such as platform 102-1 including, header scoring, initial data scoring, conditional transformation, aggregate scoring, etc.). The computer will include one or more communication connections such as network interfaces 1000-5 to enable the computer to communication with other computers over a network, storage 1000-7 such as a hard drives for storing program data 1000-8 (e.g., tabular data from files, configuration files including rules and conditions, data results from application of the rules, etc. Program data maybe in the form a database or any structure known to those skilled in the art.) and other software described above, video cards 1000-6 and other conventional components known to those skilled in the art. Computer 1000 typically runs Unix or Linux or Microsoft Windows or Macintosh OSX or other as the operating system and includes the TCP/IP protocol stack (to communicate) for communication over the Internet as known to those skilled in the art. A display 1050 is optionally used. The server typically includes TCP/IP protocol stack (to communicate) for communication over the Internet as known to those skilled in the art.

The example described above is set forth below.

EXAMPLE

Suppose the example configuration of platform 102-1 described above is applied to input data that consists of the following data (note that the data in cell H8 is, for this example, intentionally shown as an error that should instead be 8.75):

|  | col A | col B | col C | col D | col E | col F | col G | col H |
|---|---|---|---|---|---|---|---|---|
| row 1 | Joe's TV Store | | | | | | | |
| row 2 | Loan list as of Jan. 1, 2014 | | | | | | | |
| row 3 | | | | | | | | |
| row 4 | Customer | Contract | | Initial | Last | | | Amount as of |
| row 5 | Name | Date | Product | Amount | Pmt | % Down | APR | Jan. 1, 2014 |
| row 6 | John T. Smith | May 13, 2013 | TV XYZ1 | 499.99 | Dec. 1, 2013 | 10 | 9.25 | 450 |
| row 7 | Jane Doe | Nov. 22, 2012 | TV XYZ2 | 649.99 | Jul. 1, 2013 | 5 | 10.50 | 500 |
| row 8 | Clark Kent | Aug. 1, 2013 | TV XYZ1 | 589.99 | | 5 | 0.0875 | 589.99 |
| row 9 | Anthony Stark | Oct. 7, 2013 | TV ABC1 | 1099.99 | | 0 | 12.00 | 1099.99 |
| row 10 | | | | | | | | |

The platform 102-1 operates as depicted in FIG. 3 and described above. Details of how each step is processed in respect of this example set of configuration rules and example input data is described below.

1. Calculate all Possible Boundary Sets (step 300)

As described above, for this example our maximum header start row is 6, and maximum number of header rows spanned is 3, so we have the following possible boundary sets (The configuration can also be modified to evaluate the possibility that no header row exists at all, by setting the header row span to zero and removing all references in subsequent steps to header name score):

a) single-row table headers that could start at any row between and including row 1 to row 6, with table data starting in the next row. We will call these 9 possibilities $B_{1.1-1.6}$ b) two-row table headers that could start at any row between and including row 1 to row 6, with table data starting on the second row below the start row. We will call these 6 possibilities $B_{2.1\text{-}2.6}$ c) three-row table headers that could start at any row between and including row 1 to row 6, with table data starting on the third row below the start row. We will call these 6 possibilities $B_{3.1\text{-}3.6}$ 2. Calculate the aggregate score for each boundary set $B_{x,y}$ in The order in which the various values of B are evaluated is not critical; let's assume—start evaluating $B_{1.1}$. First, evaluate header scoring rules are evaluated. Starting with "Customer Last Name", it is found that the header data (which, for $B_{1.1}$, consists solely of one text string: "Joe's TV Store"), fails the match function for all of our rules (which consist of the four match expressions "(customer)?last.?name", "l.?name", "cust.*name", or "name"), and so evaluates to set of zeroes. Therefore, for each C and S, h(C, S) will equal 0, and therefore max(h(C, S)) equals zero, so each value of M equals zero, and ultimately the aggregate score for $B_{1.1}$ is zero or Z. For the same reasons, the aggregate score will be Z for many other values of B. Below, the execution process for two boundary sets, $B_{1.4}$ and $B_{1.5}$, which yield a non-Z aggregate score is examined in more detail.

2-a. Case $B_{1.4}$

For $B_{1.4}$, the header input data consists of the data in row 4, i.e. "Gust.", "Contract", "Initial", "Last", blank, blank, and "Amount as of". ("Gust." is customer) Thus the only header scoring rule that yields a non-zero result is the last rule for "Customer Last Name," which matches to the value "Last" in column E. The header scoring results for the "Customer Last Name" rules will therefore evaluate to the following results:

Header scores: h(C, S), where S="Customer Last Name", for boundary set $B_{1.4}$ (height=1 and start_row=4, header rule input={"Cust.", "Contract", Blank, "Initial", "Last", Blank, Blank. "Amount as of"}):

| C | Rule H1 | Rule H2 | Rule H3 | Rule H4 | Rule H5 | h(C, "Customer Last Name") |
|---|---|---|---|---|---|---|
| Column A | 0 | 0 | 0 | 0 | 0 | {0, 0, 0, 0, 0} |
| Column B | 0 | 0 | 0 | 0 | 0 | {0, 0, 0, 0, 0} |
| Column C | 0 | 0 | 0 | 0 | 0 | {0, 0, 0, 0, 0} |
| Column D | 0 | 0 | 0 | 0 | 0 | {0, 0, 0, 0, 0} |
| Column E | 0 | 0 | 0 | 0 | 0.3 | {0, 0, 0, 0, 0.3} |
| Column F | 0 | 0 | 0 | 0 | 0 | {0, 0, 0, 0, 0} |
| Column G | 0 | 0 | 0 | 0 | 0 | {0, 0, 0, 0, 0} |
| Column H | 0 | 0 | 0 | 0 | 0 | {0, 0, 0, 0, 0} |

For other values of S, the scores will calculate to the following:

Header scores: h(C, S), where S="Customer First Name", for boundary set $B_{1.4}$ (height=1 and start_row=4, header rule input={"Cust.", "Contract", Blank, "Initial", "Last", Blank, Blank. "Amount as of"}):

| C | Rule H6 | Rule H7 | h(C, "Customer First Name") |
|---|---|---|---|
| Column A | 0 | 0 | {0, 0} |
| Column B | 0 | 0 | {0, 0} |
| Column C | 0 | 0 | {0, 0} |
| Column D | 0 | 0 | {0, 0} |
| Column E | 0 | 0 | {0, 0} |
| Column F | 0 | 0 | {0, 0} |
| Column G | 0 | 0 | {0, 0} |
| Column H | 0 | 0 | {0, 0} |

Header scores: h(C, S), where S="Initial Balance of Loan", for boundary set $B_{1.4}$ (height=1 and start_row=4, header rule input={"Cust.", "Contract", Blank, "Initial", "Last", Blank, Blank. "Amount as of"}):

| C | Rule H8 | Rule H9 | h(C, "Initial Balance of Loan") |
|---|---|---|---|
| Column A | 0 | 0 | {0, 0} |
| Column B | 0 | 0 | {0, 0} |
| Column C | 0 | 0 | {0, 0} |
| Column D | 0 | 0 | {0, 0} |
| Column E | 0 | 0 | {0, 0} |
| Column F | 0 | 0 | {0, 0} |
| Column G | 0 | 0 | {0, 0} |
| Column H | 0 | 0.5 | {0, 0.5} |

Header scores: h(C, S), where S="APR", for boundary set $B_{1.4}$ (height=1 and start_row=4, header rule input={"Gust.", "Contract", Blank, "Initial", "Last", Blank, Blank. "Amount as of"}):

| C | Rule H10 | Rule H11 | Rule H12 | h(C, "APR") |
|---|---|---|---|---|
| Column A | 0 | 0 | 0 | {0, 0, 0} |
| Column B | 0 | 0 | 0 | {0, 0, 0} |
| Column C | 0 | 0 | 0 | {0, 0, 0} |
| Column D | 0 | 0 | 0 | {0, 0, 0} |
| Column E | 0 | 0 | 0.3 | {0, 0, 0} |
| Column F | 0 | 0 | 0 | {0, 0, 0} |
| Column G | 0 | 0 | 0 | {0, 0, 0} |
| Column H | 0 | 0 | 0 | {0, 0, 0} |

Header scores: h(C, S), where S="Date of transaction", for boundary set $B_{1.4}$ (height=1 and start_------row=4, header rule input={"Cust.", "Contract", Blank, "Initial", "Last", Blank, Blank. "Amount as of"}):

| C | Rule H13 | Rule H13 | h(C, "Date of transaction") |
|---|---|---|---|
| Column A | 0 | 0 | {0, 0} |
| Column B | 0 | 0 | {0, 0} |
| Column C | 0 | 0 | {0, 0} |
| Column D | 0 | 0 | {0, 0} |
| Column E | 0 | 0 | {0, 0} |
| Column F | 0 | 0 | {0, 0} |
| Column G | 0 | 0 | {0, 0} |
| Column H | 0 | 0 | {0, 0} |

Next, the data scores are calculated for each value of C and S. For example, when C=column E, the input to the data scoring rules will be the values "Pmt", "Dec. 1, 2013", "Jul. 1, 13", and two blanks. When S="Customer Last Name", rule D1 will be applied, and will result in a value of 0.2 because only one of the five values was alphanumeric text. When this is applied to other values of C, the following results are obtained:

Initial data scores: h(C, S), where S="Customer Last Name", for boundary set $B_{1.4}$ (height=1 and start_row=4):

| C | Rule D1 | d(C, "Customer Last Name") |
|---|---|---|
| Column A | 1 | {1} |
| Column B | 0.2 | {0.2} |
| Column C | 1 | {1} |
| Column D | 0.2 | {0.2} |
| Column E | 0.2 | {0.2} |
| Column F | 0 | {0} |

-continued

| C | Rule D1 | d(C, "Customer Last Name") |
|---|---|---|
| Column G | 0.2 | {0.2} |
| Column H | 0 | {0} |

Initial data scores: h(C, S), where S="Customer First Name", for boundary set $B_{1,4}$ (height=1 and start_row=4):

| C | Rule D2 | d(C, "Customer First Name") |
|---|---|---|
| Column A | 0.8 | {0.8} |
| Column B | 0.2 | {0.2} |
| Column C | 1 | {1} |
| Column D | 0.2 | {0.2} |
| Column E | 0.2 | {0.2} |
| Column F | 0 | {0.2} |
| Column G | 0.2 | {0.2} |
| Column H | 0 | {0} |

Initial data scores: h(C, S), where S="Initial Balance of Loan", for boundary set $B_{1,4}$
(height=1 and start_row=4):

| C | Rule D3 | d(C, "Initial Balance of Loan") |
|---|---|---|
| Column A | 0 | {0} |
| Column B | 0 | {0} |
| Column C | 0 | {0} |
| Column D | 0.8 | {0.8} |
| Column E | 0 | {0} |
| Column F | 0 | {0} |
| Column G | 0.8 | {0.8} |
| Column H | 0 | {0} |

Initial data scores: h(C, S), where S="APR", for boundary set $B_{1,4}$ (height=1 and start_row=4):

| C | Rule D4 | d(C, "APR") |
|---|---|---|
| Column A | 0 | {0} |
| Column B | 0 | {0} |
| Column C | 0 | {0} |
| Column D | 0 | {0} |
| Column E | 0 | {0} |
| Column F | 0.8 | {0.8} |
| Column G | 0.8 | {0.8} |
| Column H | 0 | {0} |

Initial data scores: h(C, S), where S="Date of transaction", for boundary set $B_{1,4}$ (height=1 and start_row=4):

| C | Rule D5 | d(C, "Date of transaction") |
|---|---|---|
| Column A | 0 | {0} |
| Column B | 0.8 | {0.8} |
| Column C | 0 | {0} |
| Column D | 0 | {0} |
| Column E | 0.4 | {0.4} |
| Column F | 0 | {0} |
| Column G | 0 | {0} |
| Column H | 0.2 | {0.2} |

The matching process next calculates all values of M as follows:

$$M(C, S) = \max(h(C, S)) * \max(d(C, S))$$

Because there are 8 values of C (columns A through H) and 5 values of S, the process ends up with 40 values of M(C, S) as follows:

max(h(C,S)):

| | Customer Last Name | Customer First Name | Initial Balance of Loan | APR | Date of Transaction |
|---|---|---|---|---|---|
| Column A | 0 | 0 | 0 | 0 | 0 |
| Column B | 0 | 0 | 0 | 0 | 0 |
| Column C | 0 | 0 | 0 | 0 | 0 |
| Column D | 0 | 0 | 0 | 0 | 0 |
| Column E | 0.3 | 0 | 0 | 0 | 0 |
| Column F | 0 | 0 | 0 | 0 | 0 |
| Column G | 0 | 0 | 0 | 0 | 0 |
| Column H | 0 | 0 | 0.5 | 0 | 0 | max(d(C,S)):

| | Customer Last Name | Customer First Name | Initial Balance of Loan | APR | Date of Transaction |
|---|---|---|---|---|---|
| Column A | 1 | 0.8 | 0 | 0 | 0 |
| Column B | 0.2 | 0.2 | 0 | 0 | 0.8 |
| Column C | 1 | 1 | 0 | 0 | 0 |
| Column D | 0.2 | 0.2 | 0.8 | 0 | 0 |
| Column E | 0.2 | 0.2 | 0 | 0 | 0.4 |
| Column F | 0 | 0 | 0 | 0.8 | 0 |
| Column G | 0.2 | 0.2 | 0.8 | 0.8 | 0 |
| Column H | 0 | 0 | 0 | 0 | 0.2 | which together, yield M(C,S) of:

| | Customer Last Name | Customer First Name | Initial Balance of Loan | APR | Date of Transaction |
|---|---|---|---|---|---|
| Column A | 0 | 0 | 0 | 0 | 0 |
| Column B | 0 | 0 | 0 | 0 | 0 |
| Column C | 0 | 0 | 0 | 0 | 0 |
| Column D | 0 | 0 | 0 | 0 | 0 |
| Column E | 0.06 | 0 | 0 | 0 | 0 |
| Column F | 0 | 0 | 0 | 0 | 0 |
| Column G | 0 | 0 | 0 | 0 | 0 |
| Column H | 0 | 0 | 0 | 0 | 0 |

In the end, $B_{1,4}$, like the other values for B that we have examined so far, only makes one (C,S) match, which is column E to Customer Last Name.

The next step is to apply the conditional transformation rules. Of particular importance to our aggregate score, which is impacted by the number of non-null standard column definitions, is rule CT1. However, the condition for CT1 is not met here, because the data matched to "Customer Last Name", in Column E, does not meet the criteria of consisting at least 80% of alphanumeric, space-or-hyphen-delimited words, and so the standard column "Customer First Name" retains its null definition.

Thus the final score for this boundary set, which yields 1 matched columns, 5 body rows and 1 header row spanned, is $1-(1/5)+(1/1)=1.8$.

2-b. Case $B_{1,5}$

Next, let's see how TDR analyzes $B_{1,5}$. The header scores will operate on the values "Name", "Date", "Product", "Amount", "Pmt", "% Down", "APR", "Jan. 1, 2014", and in doing so, several columns receive a non-zero header score:

| Header name scoring: $B_{1.5}$ | Customer Last Name | Date of transaction | Initial balance of loan | APR |
|---|---|---|---|---|
| col A | H4 = 0.5 | | | |
| col B | | H13 = 0.5 | | |
| col D | | | H9 = 0.5 | |
| col G | | | | H10 = 1 | and the corresponding (non-zero) data scoring results are:

| Data scoring (initial): $B_{1.5}$ | Customer Last Name | Date of transaction | Initial balance of loan | APR |
|---|---|---|---|---|
| col A | d = 75% | | | |
| col B | | d = 100% | | |
| col D | | | d = 100% | |
| col G | | | | d = 100% |

Which then match to:

| Header matching: $B_{1.5}$ | Customer Last Name | Date of transaction | Initial balance of loan | APR |
|---|---|---|---|---|
| Input data column: | col A | col B | col D | col G | and which, after the application of conditional transformation rules, yields:

| Conditional transformation: $B_{1.5}$ | Input data column or formula: |
|---|---|
| Customer Last Name | last word in col A |
| Customer First Name | first word(s) of col A |
| Initial balance of loan | col B |
| APR | col D/100 |
| Date of transaction | col G |

The final score for this boundary set, which yields 5 non-null standard column definitions, 4 rows of column body data and 1 header row spanned, is $5-(1/4)+(1/1)=5.75$ The full set of calculations for this case is as follows:
Header scores: h(C, S), where S="Customer Last Name", for boundary set $B_{1.5}$ (height=1 and start_row=5, header rule input={"Name", "Date", "Product", "Amount", "Pmt", "% Down", "APR", "Jan. 1, 2014"}):

| C | Rule H1 | Rule H2 | Rule H3 | Rule H4 | Rule H5 | h(C, "Customer Last Name") |
|---|---|---|---|---|---|---|
| Column A | 0 | 0 | 0 | 0.5 | 0 | {0, 0, 0, 0.5, 0} |
| Column B | 0 | 0 | 0 | 0 | 0 | {0, 0, 0, 0, 0} |
| Column C | 0 | 0 | 0 | 0 | 0 | {0, 0, 0, 0, 0} |
| Column D | 0 | 0 | 0 | 0 | 0 | {0, 0, 0, 0, 0} |
| Column E | 0 | 0 | 0 | 0 | 0 | {0, 0, 0, 0, 0} |
| Column F | 0 | 0 | 0 | 0 | 0 | {0, 0, 0, 0, 0} |
| Column G | 0 | 0 | 0 | 0 | 0 | {0, 0, 0, 0, 0} |
| Column H | 0 | 0 | 0 | 0 | 0 | {0, 0, 0, 0, 0} |

Header scores: h(C, S), where S="Customer First Name", for boundary set $B_{1.5}$ (height=1 and start_row=5, header rule input={"Name", "Date", "Product", "Amount", "Pmt", "% Down", "APR", "Jan. 1, 2014"}):

| C | Rule H6 | Rule H7 | h(C, "Customer First Name") |
|---|---|---|---|
| Column A | 0 | 0 | {0, 0} |
| Column B | 0 | 0 | {0, 0} |
| Column C | 0 | 0 | {0, 0} |
| Column D | 0 | 0 | {0, 0} |
| Column E | 0 | 0 | {0, 0} |
| Column F | 0 | 0 | {0, 0} |
| Column G | 0 | 0 | {0, 0} |
| Column H | 0 | 0 | {0, 0} |

Header scores: h(C, S), where S="Initial Balance of Loan", for boundary set $B_{1.5}$ (height=1 and start_row=5, header rule input={"Name", "Date", "Product", "Amount", "Pmt", "% Down", "APR", "Jan. 1, 2014"}):

| C | Rule H8 | Rule H9 | h(C, "Initial Balance of Loan") |
|---|---|---|---|
| Column A | 0 | 0 | {0, 0} |
| Column B | 0 | 0 | {0, 0} |
| Column C | 0 | 0 | {0, 0} |
| Column D | 0 | 0.5 | {0, 0.5} |
| Column E | 0 | 0 | {0, 0} |
| Column F | 0 | 0 | {0, 0} |
| Column G | 0 | 0 | {0, 0} |
| Column H | 0 | 0 | {0, 0} |

Header scores: h(C, S), where S="APR", for boundary set $B_{1.5}$ (height=1 and start_row=5, header rule input={"Name", "Date", "Product", "Amount", "Pmt", "% Down", "APR", "Jan. 1, 2014"}):

| C | Rule H10 | Rule H11 | Rule H12 | h(C, "APR") |
|---|---|---|---|---|
| Column A | 0 | 0 | 0 | {0, 0, 0} |
| Column B | 0 | 0 | 0 | {0, 0, 0} |
| Column C | 0 | 0 | 0 | {0, 0, 0} |
| Column D | 0 | 0 | 0 | {0, 0, 0} |
| Column E | 0 | 0 | 0 | {0, 0, 0} |
| Column F | 0 | 0 | 0 | {0, 0, 0} |
| Column G | 1 | 0 | 0 | {1, 0, 0} |
| Column H | 0 | 0 | 0 | {0, 0, 0} |

Header scores: h(C, S), where S="Date of transaction", for boundary set $B_{1.5}$ (height=1 and start_row=5, header rule input={"Name", "Date", "Product", "Amount", "Pmt", "% Down", "APR", "Jan. 1, 2014"}):

| C | Rule H13 | Rule H14 | h(C, "Date of transaction") |
|---|---|---|---|
| Column A | 0 | 0 | {0, 0} |
| Column B | 0.5 | 0 | {0.5, 0} |
| Column C | 0 | 0 | {0, 0} |
| Column D | 0 | 0 | {0, 0} |
| Column E | 0 | 0 | {0, 0} |
| Column F | 0 | 0 | {0, 0} |
| Column G | 0 | 0 | {0, 0} |
| Column H | 0 | 0 | {0, 0} |

Initial data scores: h(C, S), where S="Customer Last Name", for boundary set $B_{1.5}$ (height=1 and start_row=5):

| C | Rule D1 | d(C, "Customer Last Name") |
|---|---|---|
| Column A | 1 | {1} |
| Column B | 0 | {0} |
| Column C | 1 | {1} |
| Column D | 0 | {0} |

-continued

| C | Rule D1 | d(C, "Customer Last Name") |
|---|---------|----------------------------|
| Column E | 0 | {0} |
| Column F | 0 | {0} |
| Column G | 0 | {0} |
| Column H | 0 | {0} |

Initial data scores: h(C, S), where S="Customer First Name", for boundary set $B_{1.5}$ (height=1 and start_row=5):

| C | Rule D2 | d(C, "Customer First Name") |
|---|---------|-----------------------------|
| Column A | 0.75 | {0.75} |
| Column B | 0 | {0} |
| Column C | 1 | {1} |
| Column D | 0 | {0} |
| Column E | 0 | {0} |
| Column F | 0 | {0} |
| Column G | 0 | {0} |
| Column H | 0 | {0} |

Initial data scores: h(C, S), where S="Initial Balance of Loan", for boundary set $B_{1.5}$ (height=1 and start_row=5):

| C | Rule D3 | d(C, "Initial Balance of Loan") |
|---|---------|----------------------------------|
| Column A | 0 | {0} |
| Column B | 0 | {0} |
| Column C | 0 | {0} |
| Column D | 1 | {1} |
| Column E | 0 | {0} |
| Column F | 0 | {0} |
| Column G | 0 | {0} |
| Column H | 1 | {1} |

Initial data scores: h(C, S), where S="APR", for boundary set $B_{1.5}$ (height=1 and start_row=5):

| C | Rule D4 | d(C, "APR") |
|---|---------|-------------|
| Column A | 0 | {0} |
| Column B | 0 | {0} |
| Column C | 0 | {0} |
| Column D | 0 | {0} |
| Column E | 0 | {0} |
| Column F | 1 | {1} |
| Column G | 1 | {1} |
| Column H | 0 | {0} |

Initial data scores: h(C, S), where S="Date of transaction", for boundary set $B_{1.5}$ (height=1 and start_row=5):

| C | Rule D5 | d(C, "Date of transaction") |
|---|---------|------------------------------|
| Column A | 0 | {0} |
| Column B | 1 | {1} |
| Column C | 0 | {0} |
| Column D | 0 | {0} |
| Column E | 0.5 | {0.5} |
| Column F | 0 | {0} |
| Column G | 0 | {0} |
| Column H | 0 | {0} |

The matching process next calculates all values of M as follows:

$$M(C, S) = \max(h(C, S)) \cdot \max(d(C, S)) \max(h(C,S))$$

| | Customer Last Name | Customer First Name | Initial Balance of Loan | APR | Date of Transaction |
|---|---|---|---|---|---|
| Column A | 0.5 | 0 | 0 | 0 | 0 |
| Column B | 0 | 0 | 0 | 0 | 0.5 |
| Column C | 0 | 0 | 0 | 0 | 0 |
| Column D | 0 | 0 | 0.5 | 0 | 0 |
| Column E | 0 | 0 | 0 | 0 | 0 |
| Column F | 0 | 0 | 0 | 0 | 0 |
| Column G | 0 | 0 | 0 | 1 | 0 |
| Column H | 0 | 0 | 0 | 0 | 0 | max(d(C,S)):

| | Customer Last Name | Customer First Name | Initial Balance of Loan | APR | Date of Transaction |
|---|---|---|---|---|---|
| Column A | 1 | 0 | 0 | 0 | 0 |
| Column B | 0 | 1 | 0 | 0 | 1 |
| Column C | 1 | 0 | 0 | 0 | 0 |
| Column D | 0 | 0 | 1 | 0 | 0 |
| Column E | 0 | 0 | 0 | 0 | 0.5 |
| Column F | 0 | 0 | 0 | 1 | 0 |
| Column G | 0 | 0 | 0 | 1 | 0 |
| Column H | 0 | 0 | 1 | 0 | 0 | which together, yield M(C,S) of:

| | Customer Last Name | Customer First Name | Initial Balance of Loan | APR | Date of Transaction |
|---|---|---|---|---|---|
| Column A | 0.5 | 0 | 0 | 0 | 0 |
| Column B | 0 | 0 | 0 | 0 | 0.5 |
| Column C | 0 | 0 | 0 | 0 | 0 |
| Column D | 0 | 0 | 0.5 | 0 | 0 |
| Column E | 0 | 0 | 0 | 0 | 0 |
| Column F | 0 | 0 | 0 | 0 | 0 |
| Column G | 0 | 0 | 0 | 1 | 0 |
| Column H | 0 | 0 | 0 | 0 | 0 |

Next, conditional transformations are applied, and the application of CT 1 matches the additional standard column "Customer First Name". The final score for this boundary set, which yields 5 matched columns, 4 body rows and 1 header row spanned, is $5-(1/4)+(1/1)=5.75$ It is to be understood that the disclosure teaches examples of the illustrative embodiments and that many variations of the invention can easily be devised by those skilled in the art after reading this disclosure and that the scope of the present invention is to be determined by the claims below.

What is claimed is:

1. A computer implemented method for providing a platform for recognizing tabular data created by a plurality of applications and stored in different formats and/or organized by different standards, the tabular data comprising data within one or more rows of a plurality of input columns of unrecognized data to be mapped to a plurality of standard columns of recognized data, the method comprising executing on one or more processors the steps of:
    (a) determining one or more boundary sets for data from a data source, each set defining boundaries for header row data and data within a body row of each input column of the plurality of columns;
    (b) selecting a boundary set of the one or more boundary sets;

(c) calculating a set of header scores for header row data, by calculating, for a each header row data of each input column of the boundary set and each standard column, a header score representing the extent to which the header row data is recognized as a header of the standard column;

(d) calculating a set of data scores for body row data, by calculating, for each input column of the boundary set and each standard column, a data score representing the extent to which the data within body rows of each input column is recognized as data of a the standard column; and (e) mapping the plurality of input columns to the plurality of standard columns by applying a function to the header scores and data scores to thereby yield a set of combined scores and assigning a best match of the plurality of input columns to the plurality of standard columns by iteratively selecting a highest combined score for an unmatched input column and unmatched standard column that exceeds a threshold.

2. The computer implemented method of claim 1 further comprising (f) performing conditional transformation with respect to data of each mapping yielded, wherein performing conditional transformation includes:

for one or more rules, each of the one or more rules including a condition, a standard column and a formulaic definition for the standard column, evaluating each condition against the data of each input column and/or data results yielded from steps (c)-(e) and, if each condition is satisfied, redefining the mapping to apply to the formulaic definition.

3. The computer implemented method of claim 2 further comprising (g) calculating an aggregate score for the boundary set of header data and data within the body rows of each input column based on a predefined formula that yields a result representing the degree to which the generated mapping were recognized as the set of standard columns as defined by a configuration.

4. The computer implemented method of claim 3 wherein steps (b)-(g) are repeated if there is an additional boundary set of the one or more boundary sets.

5. The computer implemented method of claim 3 further comprising identifying the highest aggregate score for a plurality of boundary sets to predict the correct boundary set.

6. The computer implemented method of claim 1 further comprising (f) calculating an aggregate score for the boundary set of header data and data within the body rows of each input column based on a predefined formula that yields a result representing the degree to which the set of generated mappings were recognized as of the set of standard columns as defined by a configuration.

7. The computer implemented method of claim 1 wherein calculating a header score includes applying a predefined header scoring rule to the header row data of each input column.

8. The computer implemented method of claim 7 wherein the predefined header scoring rule is a function of a regular expression matching, string manipulation or data type checking, or any combination thereof.

9. The computer implemented method of claim 1 wherein calculating a data score includes applying a predefined data scoring rule to data in the body rows of each input column.

10. The computer implemented method of claim 1 wherein the header score and initial data score are calculated simultaneously or in series.

11. A system for recognizing tabular data created by a plurality of applications and stored in different formats and/or organized by different standards, the tabular data comprising data within one or more rows of a plurality of input columns of unrecognized data to be mapped to a plurality of standard columns of recognized data, the system comprising:

(a) a data store to storing tabular data, each tabular data comprising data within one or more rows of a plurality of input columns; and (b) one or more servers coupled to the data store and programmed to:

(i) determine one or more boundary sets for data from a data source, each set defining boundaries for header row data and data within a body row of each input column of the plurality of input columns;

(ii) select a boundary set of the one or more boundary sets;

(iii) calculate a set of header scores for a header row data, by calculating for each header row data of each input column of the boundary set and each standard column, a score representing the extent to which the header row data is recognized as a header of a the standard column;

(iv) calculate a set of data scores for body row data, by calculating, for an input column of the boundary set and each standard column, a data score representing the extent to which the data within body rows of each input column is recognized as the data of the standard column; and (v) mapping the plurality of input columns to the plurality of standard columns by applying a function to the header scores and data scores to thereby yield a set of combined scores and assigning a best match of the plurality of input columns to the plurality of standard columns by iteratively selecting a highest combined score for an unmatched input column and unmatched standard column that exceeds a threshold.

12. The system of claim 11 wherein the one or more servers are further programmed to: (vi) perform conditional transformation with respect to each mapping, wherein performing conditional transformation includes:

for one or more rules, each of the one or more rules including a condition, a standard column and a formulaic definition for the standard column, evaluating each condition against the data of each input column and/or data results yielded from steps (iii) - (v) and, if each condition is satisfied, redefining the mapping to apply to the formulaic definition.

13. The system of claim 12 wherein the one or more servers are further programmed to: (vii) calculate an aggregate score for the boundary set of header data and data within the body rows of each input column based on a predefined rule that represents the strength of the recognition of that data.

14. The system of claim 12 wherein the one or more servers are further programmed to: (vii) repeat steps (i)-(vi) if there is an additional boundary set of the one or more boundary sets.

15. A non-transitory computer-readable medium for providing a platform for recognizing tabular data created by a plurality of applications and stored in different formats and/or organized by different standards, the tabular data comprising data within one or more rows of a plurality of input columns of unrecognized data to be mapped to a plurality of standard columns of recognized data, the medium comprising instructions stored thereon, that when executed on a processor, perform the steps of:

(a) determining one or more boundary sets for data from a data source, each set defining boundaries for header row data and data within a body row of each input column;

(b) selecting a boundary set of the one or more boundary sets;

(c) calculating a header score for a header row data, by calculating for each header row of each input column of the boundary set and each standard column, a header score representing the extent to which the header row data is recognized as a header of a standard column;

(d) calculating an initial a set data score for body row data, by calculating, for each input column of the boundary set and each standard column, a data score representing the extent to which the data within body rows of the input column recognized as the data of a the standard column; and (e) mapping the plurality of input columns to the plurality of standard columns by applying a function to the header scores and data scores to thereby yield a set of combined scores and assigning a best match of the plurality of input columns to the plurality of standard columns by iteratively selecting a highest combined score for an unmatched input column and unmatched standard column that exceeds a threshold.

16. The non-transitory computer-readable medium of claim 15 further comprising instructions stored thereon, that when executed on a processor, perform the steps of (f) performing conditional transformation with respect to each mapping yielded, wherein performing conditional transformation includes:

for one or more rules, each of the one or more rules including a condition, a standard column and a formulaic definition for the standard column, evaluating each condition against the data of the input column and/or data results yielded from steps (c)-(e) and, if each condition is satisfied, redefining the mapping to apply to the formulaic definition.

17. A computer implemented method for providing a platform for recognizing tabular data created by a plurality of applications and stored in different formats and/or organized by different standards, the tabular data comprising data within one or more rows of a plurality of input columns of unrecognized data to be mapped to a plurality of standard columns of recognized data, the method comprising executing on one or more processors the steps of:

(a) selecting a boundary set for data from a data source, the set defining a boundary for header row data and data within a body row of each input column;

(b) calculating a set of header scores for a header row data, by calculating of each input column of the boundary set and each standard column, a header score representing the extent to which the header row data is recognized as a header of the standard column;

(c) calculating a data scores for body row data, by calculating, for an input column of the boundary set and each standard column, a data score representing the extent to which the data within body rows of each input column is recognized as the data of the standard column, and (d) mapping the plurality of input columns to the plurality of standard columns by applying a function to the header scores and data scores to thereby yield a set of combined scores and assigning a best match of the plurality of input columns to the plurality of standard columns by iteratively selecting a highest combined score for an unmatched input column and unmatched standard column that exceeds a threshold.

18. The computer implemented method of claim 17 further comprising (f) performing conditional transformation with respect to each mapping, wherein performing conditional transformation includes:

for one or more rules, each of the one or more rules including a condition, a standard column and a formulaic definition for the standard column, evaluating each condition against the data of the input column and/or data results yielded from steps (b)-(d) and, if each condition is satisfied, redefining the mapping to the formulaic definition.

19. A system for recognizing tabular data created by a plurality of applications and stored in different formats and/or organized by different standards the tabular data comprising data within one or more rows of a plurality of input columns of unrecognized data to be mapped to a plurality of standard columns of recognized data, the system comprising:

(a) a data store for storing tabular data, each tabular data comprising data within one or more rows of a plurality of input columns; and (b) one or more servers coupled to the data store and programmed to:

(i) select a boundary set for data from a data source, each set defining boundaries for header row data and data within a body row of each input column of the plurality of columns;

(ii) calculate a set of header scores for a header row data, by calculating for each header row data of each input column of the boundary set and each standard column, a header data score representing the extent to which the header row data is recognized as a header of the standard column; and (iii) calculate a set of data scores for body row data, by calculating, for an of input column for the boundary set and each standard column, a data score representing the extent to which the data within body rows of each input column is recognized as the data of the standard column; and (iv) mapping the plurality of input columns to the plurality of standard columns by applying a function to the header scores and data scores to thereby yield a set of combined scores and assigning a best match of the plurality of input columns to the plurality of standard columns by iteratively selecting a highest combined score for an unmatched input column and unmatched standard column that exceeds a threshold.

20. The system of claim 19 wherein the one or more servers are further programmed to: (vi) perform conditional transformation with respect each mapping, wherein performing conditional transformation includes:

for one or more rules, each of the one or more rules including a condition, a standard column and a formulaic definition for the standard column, evaluating each condition against the data of the input column and/or data results yielded from steps (ii)-(iv) and, if each condition is satisfied, redefining the mapping to the formulaic definition.

* * * * *